US011829943B1

(12) United States Patent
Mohanty et al.

(10) Patent No.: US 11,829,943 B1
(45) Date of Patent: Nov. 28, 2023

(54) UPDATING A POSITION OF A USER WITHIN A MATERIALS HANDLING FACILITY

(71) Applicant: Amazon Technologies, Inc., Seattle, WA (US)

(72) Inventors: Pranab Mohanty, Redmond, WA (US); Shrivatsan Vasudhevan, Sammamish, WA (US); Frank Florian Liberato, Kirkland, WA (US); Jiajun Zhao, Bellevue, WA (US); Maxwell Aaron Corman, Seattle, WA (US); Ammar Chinoy, Seattle, WA (US); Joachim Sebastian Stahl, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 17/071,705

(22) Filed: Oct. 15, 2020

Related U.S. Application Data

(62) Division of application No. 14/668,603, filed on Mar. 25, 2015, now Pat. No. 10,810,539.

(51) Int. Cl.
*G06V 10/75* (2022.01)
*G06V 20/52* (2022.01)
(Continued)

(52) U.S. Cl.
CPC ......... *G06Q 10/087* (2013.01); *G06V 10/758* (2022.01); *G06V 20/52* (2022.01);
(Continued)

(58) Field of Classification Search
CPC .... G06Q 10/087; G06V 20/52; G06V 40/103; G06V 10/758; G06T 2207/20076; G06T 2207/30196
(Continued)

(56) References Cited

U.S. PATENT DOCUMENTS 6,185,314 B1 2/2001 Crabtree et al.
6,263,088 B1 7/2001 Crabtree et al.
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Kenny A Cese
(74) *Attorney, Agent, or Firm* — Athorus, PLLC

(57) ABSTRACT

Described is a multiple-camera system and process for re-identifying a user located in a materials handling facility based on user patterns and/or descriptors representative of the user. In one implementation, a user pattern and/or a plurality of descriptors representative of a user are maintained as a position of a user is tracked through a materials handling facility. If the tracking of the user is lost, the last known position is stored with the user pattern and/or descriptors. If a new object is detected and confirmed to be a user, a user pattern and/or descriptors of the new object are compared with the stored user pattern and/or descriptors to determine if the new object is the user.

17 Claims, 16 Drawing Sheets

(51) Int. Cl.
   *G06V 40/10* (2022.01)
   *G06Q 10/087* (2023.01)
(52) U.S. Cl.
   CPC .. *G06V 40/103* (2022.01); *G06T 2207/20076* (2013.01); *G06T 2207/30196* (2013.01)
(58) Field of Classification Search
   USPC .......................................................... 382/103
   See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Inaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 2003/0002712 | A1 | 1/2003 | Steenburgh et al. |
| 2004/0181467 | A1 | 9/2004 | Raiyani et al. |
| 2004/0228503 | A1 | 11/2004 | Cutler |
| 2007/0211938 | A1 | 9/2007 | Tu et al. |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2009/0010490 | A1* | 1/2009 | Wang ............... G06T 7/285 382/103 |
| 2009/0052739 | A1* | 2/2009 | Takahashi ........... G06V 40/103 382/103 |
| 2009/0121017 | A1 | 5/2009 | Cato et al. |
| 2009/0129631 | A1 | 5/2009 | Faure et al. |
| 2009/0245573 | A1* | 10/2009 | Saptharishi ....... H04N 5/23206 382/103 |
| 2009/0304229 | A1* | 12/2009 | Hampapur ........... G06V 10/28 382/103 |
| 2009/0324020 | A1 | 12/2009 | Hasebe et al. |
| 2010/0266159 | A1 | 10/2010 | Jeki et al. |
| 2011/0011936 | A1 | 1/2011 | Morandi et al. |
| 2011/0080336 | A1 | 4/2011 | Leyvand et al. |
| 2011/0142286 | A1* | 6/2011 | Morriyama .......... A01K 11/006 382/103 |
| 2012/0020518 | A1* | 1/2012 | Taguchi ............... G06T 7/292 382/103 |
| 2012/0026335 | A1* | 2/2012 | Brown ................. G06T 7/292 382/103 |
| 2012/0045096 | A1* | 2/2012 | Naito ................. G06V 20/52 382/103 |
| 2012/0093364 | A1 | 4/2012 | Sato |
| 2012/0143856 | A1* | 6/2012 | Klinkigt ............. G06V 10/462 707/723 |
| 2012/0170804 | A1 | 7/2012 | Lin et al. |
| 2012/0281878 | A1 | 11/2012 | Matsuda et al. |
| 2012/0284132 | A1 | 11/2012 | Kim et al. |
| 2013/0076898 | A1 | 3/2013 | Philippe et al. |
| 2013/0182114 | A1 | 7/2013 | Zhang et al. |
| 2013/0182905 | A1* | 7/2013 | Myers ................. A61B 5/1128 382/103 |
| 2013/0184887 | A1 | 7/2013 | Ainsley et al. |
| 2013/0253700 | A1 | 9/2013 | Carson et al. |
| 2013/0287259 | A1* | 10/2013 | Ishii ..................... G06T 7/136 382/103 |
| 2013/0342652 | A1* | 12/2013 | Kikkeri ................ B25J 9/104 348/46 |
| 2014/0050352 | A1 | 2/2014 | Buehler et al. |
| 2014/0072170 | A1* | 3/2014 | Zhang ............... G06V 40/103 382/103 |
| 2014/0072174 | A1 | 3/2014 | Wedge |
| 2014/0107842 | A1* | 4/2014 | Yoon .................... G06V 40/23 382/103 |
| 2014/0279294 | A1 | 9/2014 | Field-Darragh et al. |
| 2014/0328512 | A1* | 11/2014 | Gurwicz .............. G06K 9/6267 382/103 |
| 2014/0355825 | A1 | 12/2014 | Kim et al. |
| 2014/0362223 | A1 | 12/2014 | LaCroix et al. |
| 2015/0019391 | A1 | 1/2015 | Kumar et al. |
| 2015/0073907 | A1 | 3/2015 | Purves et al. |
| 2015/0146921 | A1* | 5/2015 | Ono .................... G06V 40/10 382/103 |
| 2015/0213328 | A1 | 7/2015 | Mase |
| 2015/0262365 | A1 | 9/2015 | Shimizu |
| 2015/0356840 | A1* | 12/2015 | Wang ............... G08B 13/19691 382/103 |
| 2016/0110613 | A1 | 4/2016 | Ghanem et al. |
| 2016/0217326 | A1 | 7/2016 | Hosoi |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

UPDATING A POSITION OF A USER WITHIN A MATERIALS HANDLING FACILITY

PRIORITY CLAIM

This application is a divisional of U.S. patent application Ser. No. 14/668,603, filed Mar. 25, 2015, and titled "Re-Establishing Tracking Of A User Within A Materials Handling Facility," the contents of which are herein incorporated by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
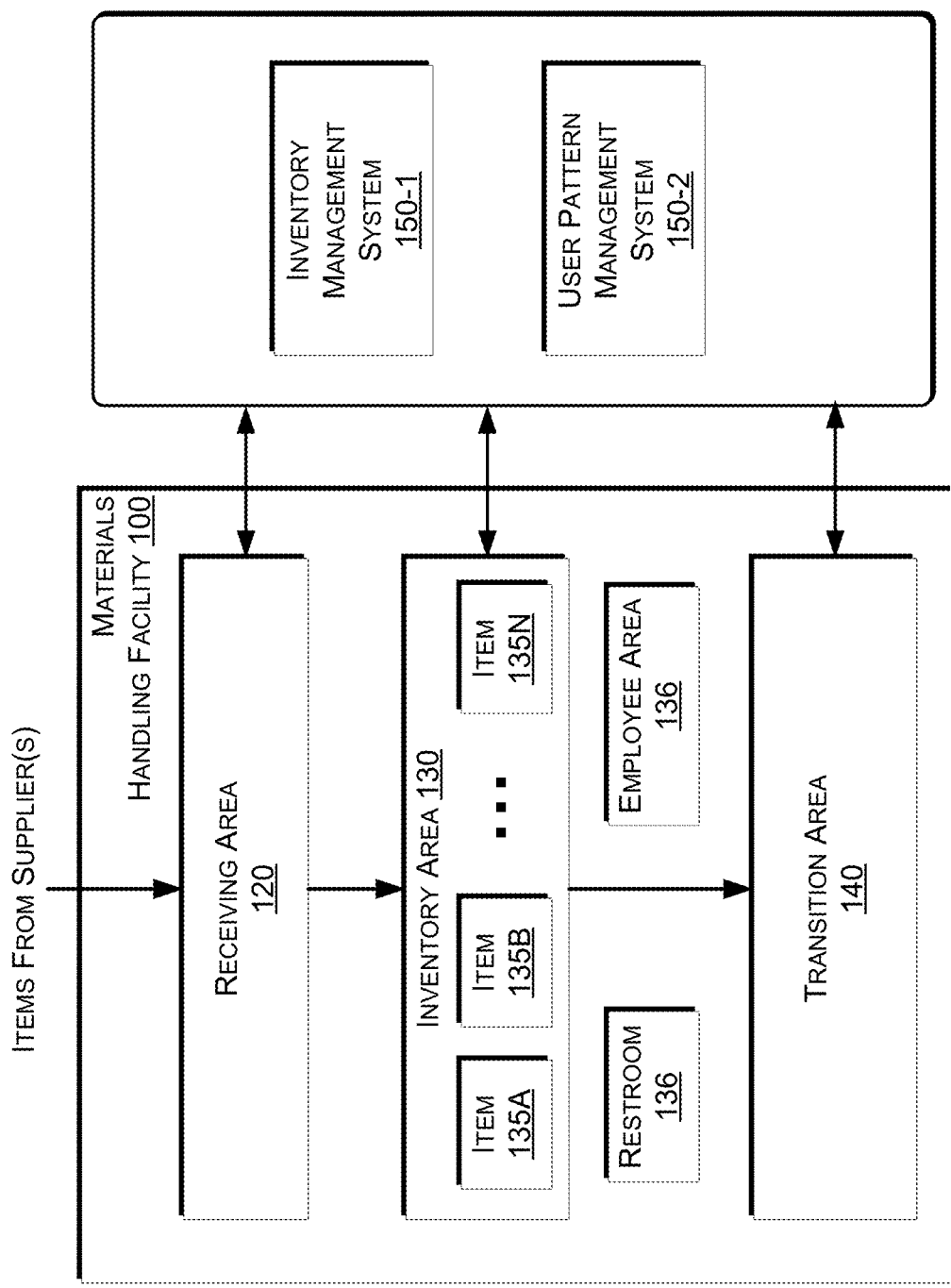
FIG. 1 is a block diagram illustrating a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a multiple-camera system and process for establishing a user pattern representative of a user and tracking that user as they move throughout a materials handling facility. In some implementations, the materials handling facility may include multiple overhead cameras that are fixed at defined distances above a surface of the materials handling facility and oriented toward the surface. The cameras obtain images that include color values and depth values for each pixel of the image. The color values and depth values may then be used to determine a user pattern representative of a user that is positioned within a field of view of one or more of the cameras.

As the user moves through the materials handling facility, images are obtained and processed to track a position of the user and store position information corresponding to the user. As part of the tracking process, a user pattern that includes data representative of the user is periodically determined from obtained images. The user pattern may be compared with stored user patterns associated with the user and/or a user pattern data store that includes representative user patterns to confirm that the detected object is the user. Likewise, the distance between positions of the detected object and direction of travel may be utilized to confirm that the detected object is the user.

In some implementations, one or more descriptors representative of the user may also be determined and stored. The descriptors may be any feature or characteristic of the user that may aid in the tracking or identification of the user while the user is located in the materials handling facility. For example, if the user is wearing a bright yellow shirt, the color of the user's torso may be determined and stored as a descriptor in a descriptor data store. Descriptors may be periodically obtained and added to the descriptor data store as the user moves about the materials handling facility.

In some implementations, sets of the user pattern data may be associated with one or more descriptor regions and descriptors for those regions may be determined and stored in the descriptor data store. For example, the user pattern may be segmented into a head descriptor region, a torso descriptor region, and/or a lower body descriptor region. Sets of user pattern data corresponding to those may be associated with those regions and a descriptor representative of the associated user pattern data may then be determined and stored in the descriptor data store.

In addition to tracking a position of the user as the user moves through the materials handling facility, in some implementations, stored user pattern data representative of the user and/or the stored descriptors representative of the user may be used to reestablish a tracking of the user within the materials handling facility. For example, if a user being tracked in a materials handling facility moves outside of a view of the cameras (e.g., enters a restroom, moves into an area where a camera is inoperable), the tracking of the user may be lost. At some point in time, the user will be rediscovered or detected when they re-enter the field of view of a camera. Because there is no continuity between the user that was being tracked but was lost and the newly discovered user, a user pattern and/or descriptors of the newly discovered user may be determined and compared with the previously stored user patterns and descriptors of the lost user. Based on the similarity between the user pattern and/or descriptors of the newly discovered user and the stored user pattern and/or descriptors of the lost user, the newly discovered user may be determined to be the lost user, and the position of the lost user may be updated to match the position of the newly discovered user.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, one or more transition areas 140, one or more restrooms 136, and one or more employee areas 134 or break-rooms. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150-1 configured to interact with each of receiving area 120, inventory area 130, transition area 140 and/or users within the materials handling facility 100. Likewise, the materials handling facility 100 includes a user pattern management system 150-2 configured to interact with image capture devices at each of the receiving area 120, inventory area 130, and/or transition area 140 and to track users as they move throughout the materials handling facility 100.

The materials handling facility 100 may be configured to receive different kinds of inventory items 135 from various suppliers and to store them until a user orders or retrieves one or more of the items. The general flow of items through the materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged and the inventory management system (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 on an inventory shelf. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from the inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory location, moved a distance and placed at another location.

As discussed further below, as the user moves through the materials handling facility, images of the user may be obtained and processed by the user pattern management system to determine a user pattern representative of the user and to track a position of the user as the user moves. Likewise, descriptors representative of the user may be periodically determined for the user from the obtained images as the user moves about the materials handling facility. The user pattern and/or the descriptors, as discussed below, may be used to aid in the tracking or re-establishment of a tracking of the user within the materials handling facility.

Figure 2:
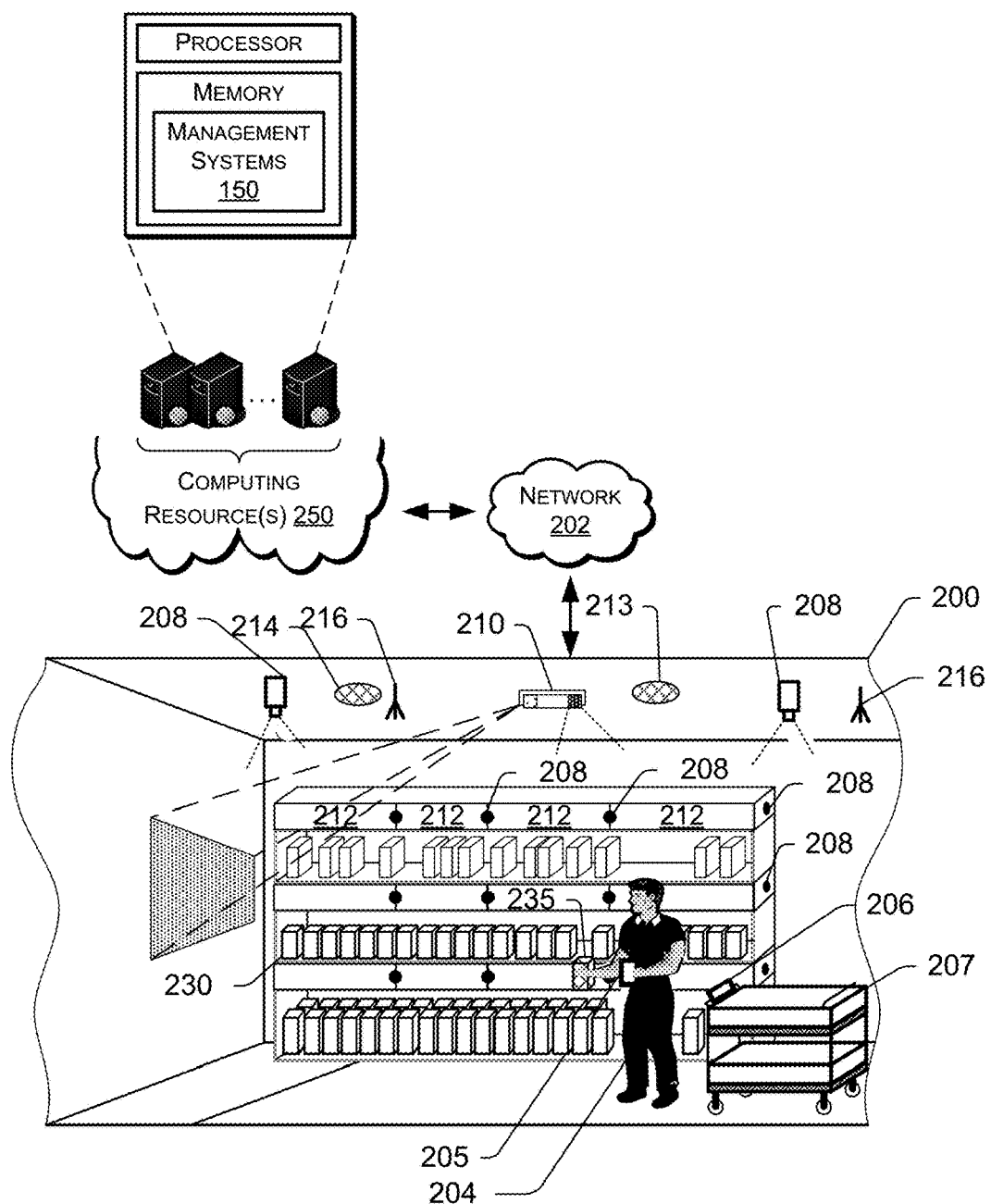
FIG. 2 shows additional components of the materials handling facility of FIG. 1, according to an implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling, and oriented toward a surface (e.g., floor) of the material handling facility so that the image capture devices 208 are approximately perpendicular with the surface and the field of view is oriented toward the surface. The overhead image capture devices may then be used to capture images of users and/or locations within the materials handling facility from an overhead view. In addition, in some implementations, one or more cameras 208 may be positioned on or inside of inventory areas. For example, a series of cameras 208 may be positioned on external portions of the inventory areas and positioned to capture images of users and/or the location surrounding the inventory area.

Any type of camera and/or configuration of cameras may be used with the implementations described herein. For example, one or more of the cameras may be a red, green, blue ("RGB") color camera, still camera, motion capture/video camera, etc. In other implementations, one or more of the cameras may be depth sensing cameras, also referred to herein as a RGBD camera. In still other implementations, one or more of the cameras may be a thermographic or infrared (IR) camera, etc. In some implementations, the cameras may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 860×480 at six frames per second. The image sensor may likewise be configured to provide the image data to other components (e.g., a graphics processing unit) for processing and/or other systems, such as the user pattern management system 150-2. In some implementations, cameras may be paired to provide stereo imagery and depth values indicating a distance between the camera and an object being imaged. A stereo camera may include a pair of camera modules. Image data may be stored in any variety of formats including, but not limited to, YUYV, RGB, RAW, HEX, HSV, HLS, CMYK, bmp, jpeg, etc.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green or blue) expressed in the reflected light, and store values associated with the pixel colors as image data and/or transmit image data to another device for further analysis or reproduction. The camera may also be configured to determine depth values, such as the distance between the camera and an object in the field of view of the camera. Depth values may be included in the image data generated by the camera.

Information and/or data regarding features or objects represented in a digital image may be extracted from the image in any number of ways. For example, a color of a pixel or a group of pixels in image data may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of an image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In addition to cameras, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, a light curtain may be virtually positioned to cover the front of an inventory area and detect when an object (e.g., a user's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When a user 204 arrives at the materials handling facility 200, one or more images of the user 204 may be captured and processed. For example, the images of the user 204 may be processed to identify the user. This may be done using a variety of techniques, such as facial recognition, pattern matching, etc. In some implementations, rather than or in addition to processing images to identify the user 204, other techniques may be utilized to identify the user. For example, the user may provide an identification (e.g., user name, password), the user may present an identifier (e.g., identification badge, card), an RFID tag in the possession of the user may be detected, a visual tag (e.g., barcode, bokode, watermark) in the possession of the user may be detected, biometrics may be utilized to identify the user, etc.

Figure 6B:
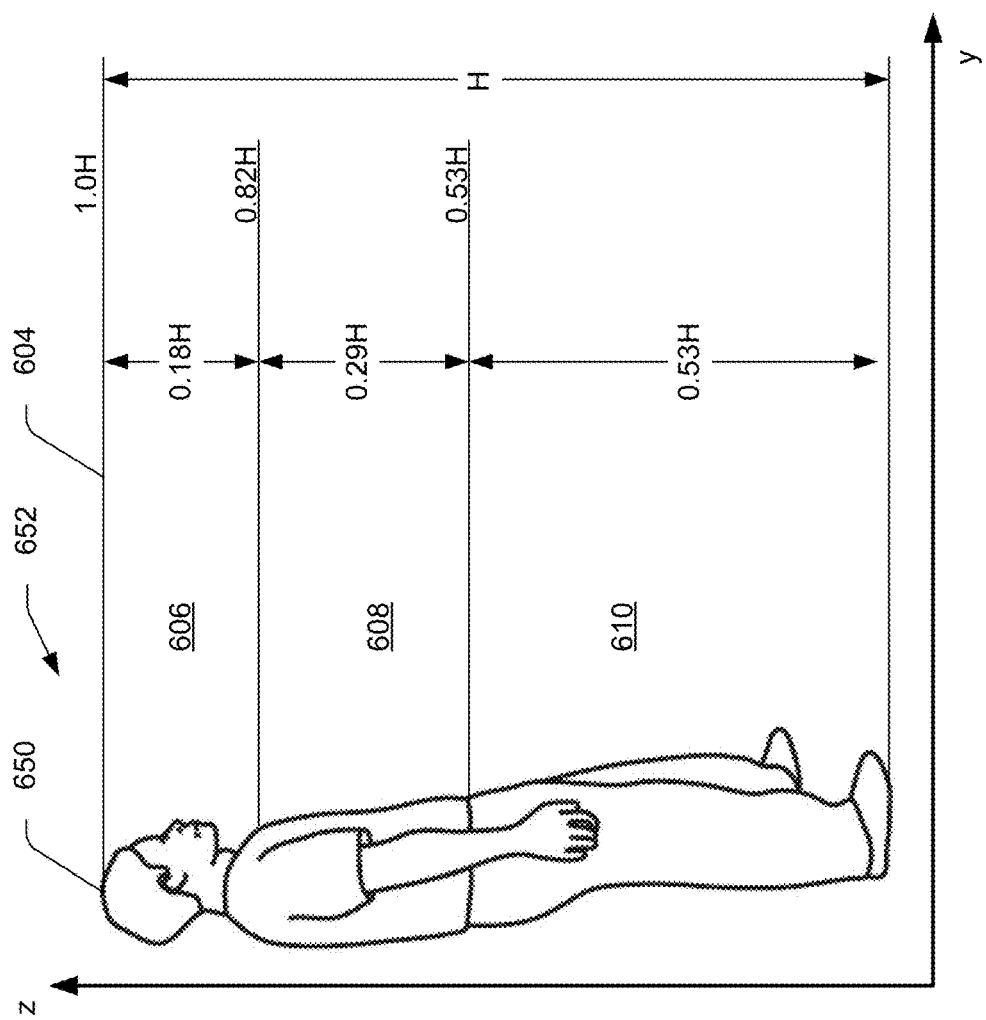
FIG. 6B is a side view of a user pattern obtained from overhead cameras, according to an implementation.
Figure 6A:
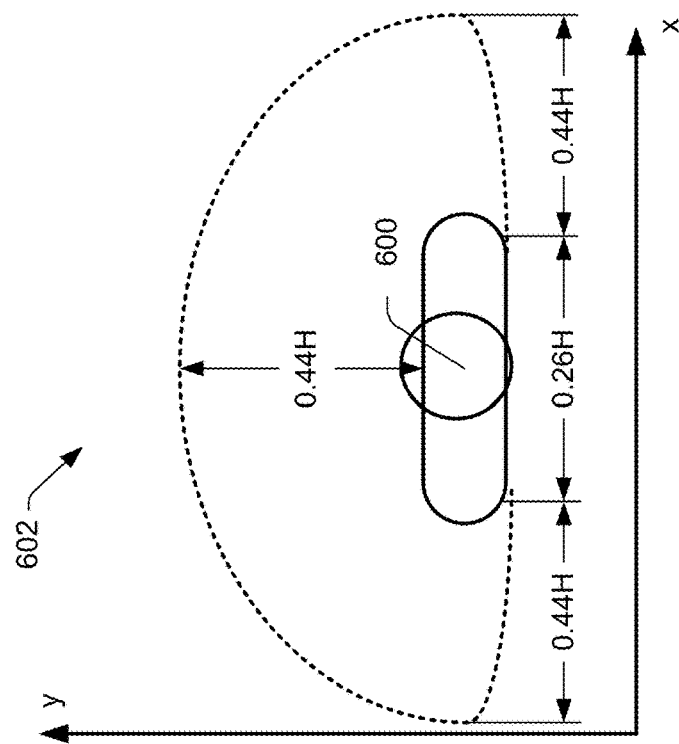
FIG. 6A is an overhead view of a user pattern obtained from overhead cameras, according to an implementation.
Figure 7:
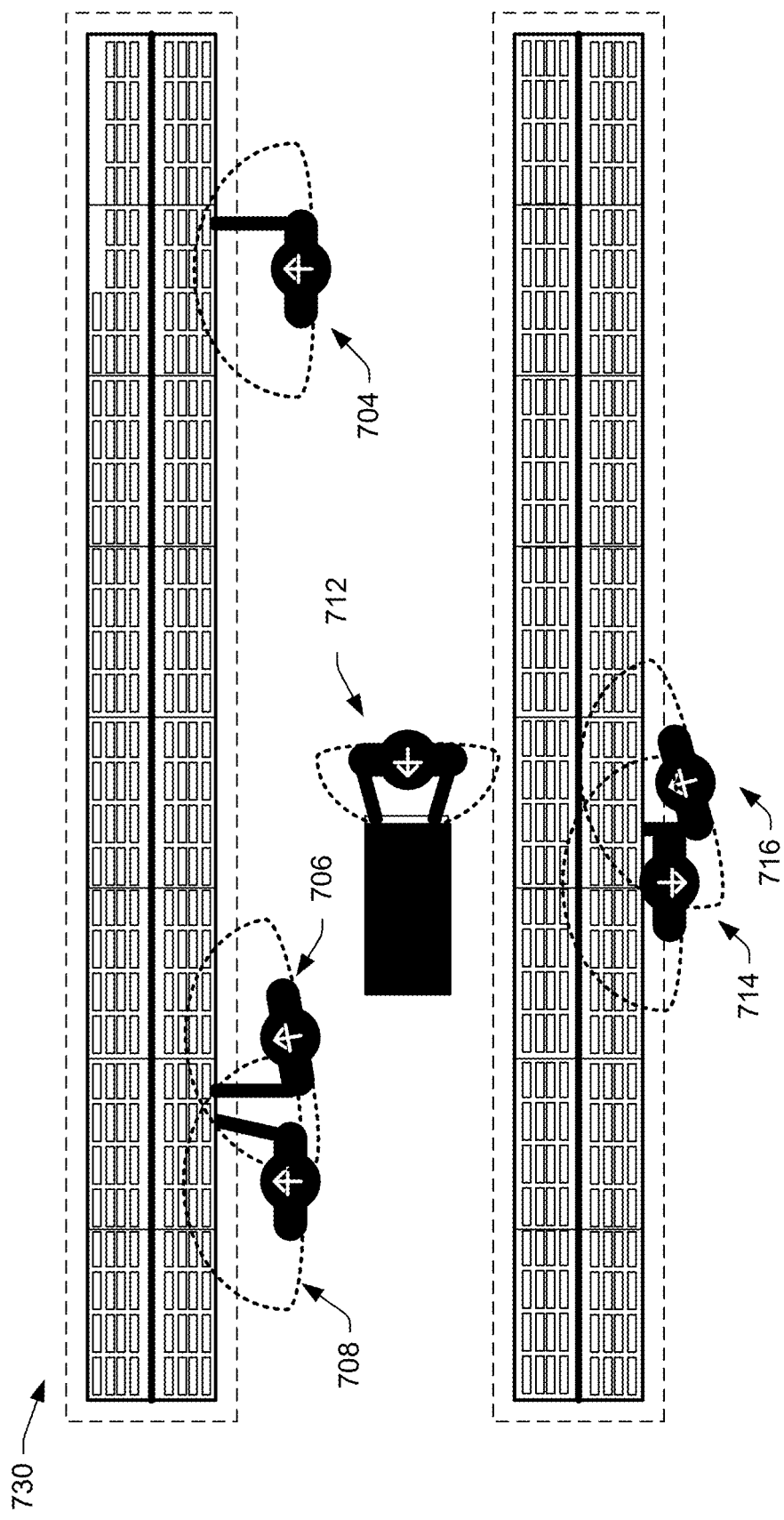
FIG. 7 is an overhead view of an inventory area and a plurality of user patterns, according to an implementation.

The captured images and/or other inputs may also be used to establish a user pattern for the user 204 while located in the materials handling facility 200. The user pattern includes data that may identify an overall shape, size, height, etc., of the user. For example, referring briefly to FIGS. 6A, 6B, and 7, illustrated are several different views and perspectives that may be represented from user pattern data. In this implementation, the user patterns are determined from overhead cameras positioned above the inventory area and oriented to obtain images of users as they move through the inventory area. As the user moves, the position and orientation of the user pattern is updated.

In addition to establishing a user pattern when the user first arrives at the materials handling facility and is identified, one or more descriptors representative of the user or the user pattern may be determined. For example, as discussed further below with respect to FIGS. 6A and 6B, one or more descriptor regions may be established, such as a torso region or a head region and a descriptor representative of the region may be determined, stored in a descriptor data store and associated with the user or the user pattern while the user is located in the materials handling facility. In some implementations, the determined user patterns of the user may be stored and maintained as representative of the user and used at a later point in time to identify the user (e.g., when the user returns to the materials handling facility on a different date). In comparison, the descriptors may only be stored for a limited period of time and used to identify the person during the current time they are in the materials handling facility. When the user exits the materials handling facility, the descriptors may be discarded.

Returning to FIG. 2, in some implementations, a user located in the materials handling facility 200 may possess a portable device 205 and obtain information about items located within the materials handling facility 200, receive confirmation that the inventory management system has correctly identified items that are picked and/or placed by the user, receive requests for confirmation regarding one or more event aspects, etc. Generally, the portable device has at least a wireless module to facilitate communication with the management systems 150 (e.g., the inventory management system) and a display (e.g., a touch based display) to facilitate visible presentation to and interaction with the user. The portable device may store a unique identifier and provide that unique identifier to the management systems 150 and be used to identify the user. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management systems 150. Likewise, components of the management systems 150 may interact and communicate with the portable device as well as identify the user, communicate with the user via other means and/or communicate with other components of the management systems 150.

Generally, the management systems 150 may include one or more input/output devices, such as imaging devices (e.g., cameras) 208, projectors 210, displays 212, speakers 213, microphones 214, multiple-camera apparatus 227, illumination elements (e.g., lights), etc., to facilitate communication between the management systems 150 and/or the user and detection of items, events and/or other actions within the materials handling facility 200. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the management systems 150 may also include one or more communication devices, such as wireless antennas 216, which facilitate wireless communication (e.g., Wi-Fi, Near Field Communication (NFC), Bluetooth) between the management systems 150 and other components or devices. The management systems 150 may also include one or more computing resource(s) 250, such as a server system, that may be local to the environment (e.g., materials handling facility), remote from the environment, or any combination thereof.

The management systems 150 may utilize antennas 216 within the materials handling facility 200 to create a network 202 (e.g., Wi-Fi) so that the components and devices can connect to and communicate with the management systems 150. For example, when the user picks an item 235 from an inventory area 230, a camera of the multiple-camera apparatus 227 may detect the removal of the item and the management systems 150 may receive information, such as image data of the performed action (item pick from the inventory area), identifying that an item has been picked from the inventory area 230. The event aspects (e.g., user identity, action performed, item involved in the event) may then be determined by the management systems 150.

Figure 3:
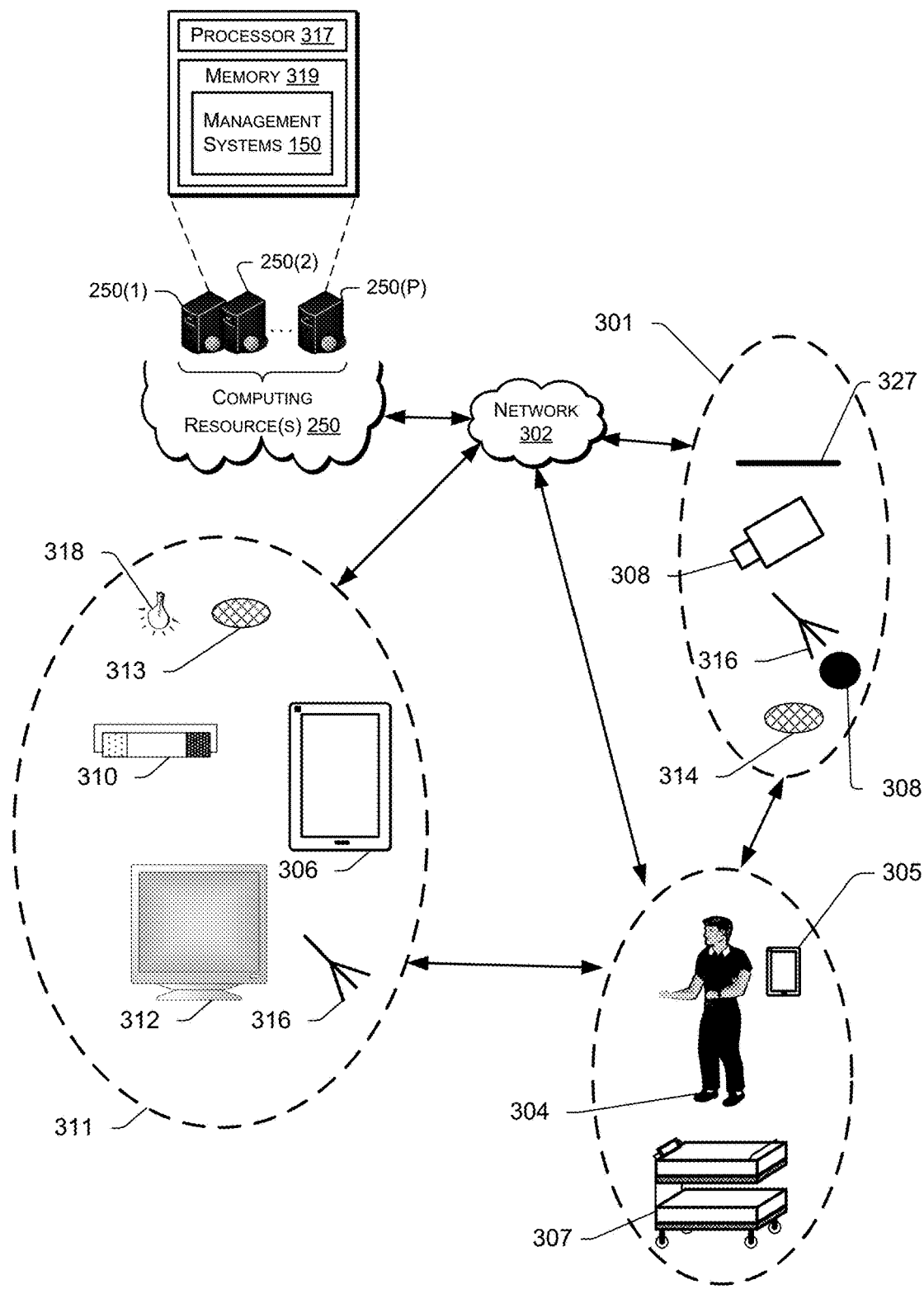
FIG. 3 shows components and communication paths between component types utilized in a materials handling facility of FIG. 1, according to an implementation.

FIG. 3 shows example components and communication paths between component types utilized in a materials handling facility 100, in accordance with one implementation. A portable device 305 may communicate and interact with various components of management systems 150 over a variety of communication paths. Generally, the management systems 150 may include input components 301, output components 311 and computing resource(s) 250. The input components 301 may include an imaging device 308, a multiple-camera apparatus 327, microphone 314, antenna 316, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The management systems 150 may also include computing resource(s) 250. The computing resource(s) 250 may be local to the environment (e.g., materials handling facility), remote from the environment, or any combination thereof. Likewise, the computing resource(s) 250 may be configured to communicate over a network 302 with input components 301, output components 311 and/or directly with the portable device 305, a user 304 and/or the tote 307.

As illustrated, the computing resource(s) 250 may be remote from the environment and implemented as one or more servers 250(1), 250(2), . . . , 250(P) and may, in some instances, form a portion of a network-accessible computing platform implemented as a computing infrastructure of processors, storage, software, data access, and so forth that is maintained and accessible by components/devices of the management systems 150 and/or the portable device 305 via a network 302, such as an intranet (e.g., local area network), the Internet, etc. The server system 250 may process images of users to identify the user, process images of items to identify items, determine a location of items and/or determine a position of items. The server system(s) 250 does not require end-user knowledge of the physical location and configuration of the system that delivers the services. Common expressions associated for these remote computing resource(s) 250 include "on-demand computing," "software as a service (SaaS)," "platform computing," "network-accessible platform," "cloud services," "data centers," and so forth.

Each of the servers 250(1)-(P) include a processor 317 and memory 319, which may store or otherwise have access to an management systems 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., radio frequency, infrared, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
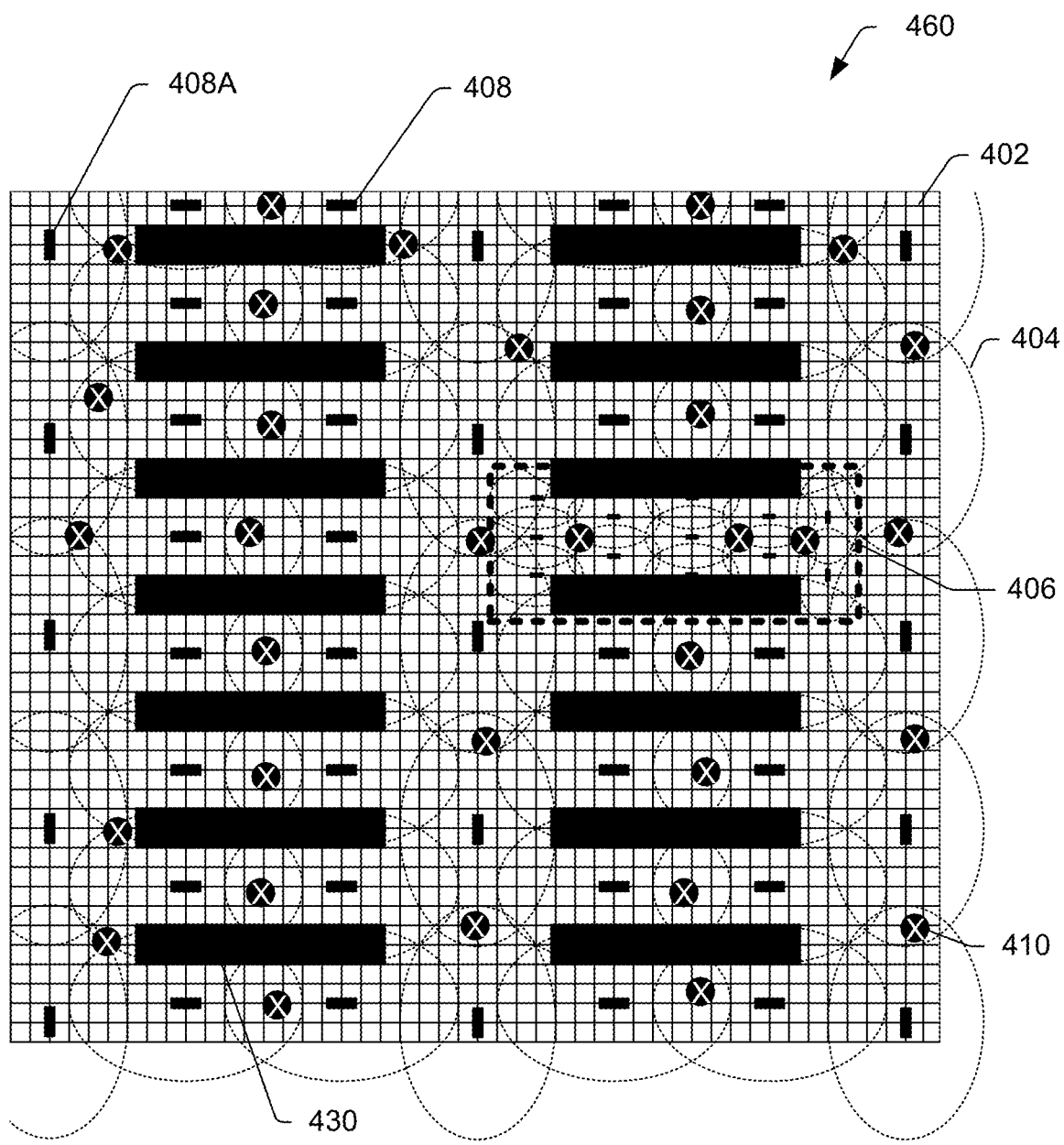
FIG. 4 is a block diagram of an overhead view of a cluster, according to an implementation.

FIG. 4 is a block diagram of an overhead view of a cluster 460, according to an implementation. A cluster may represent a segment of a materials handling facility 100. In some implementations, a single materials handling facility may include a plurality of clusters. In other implementations, a single cluster may be used to cover an entire materials handling facility.

Within each cluster 460, a plurality of cameras 408 may be positioned overhead (e.g., on a ceiling) at defined locations so that the collective field of view of the cameras covers the entire surface of the portion of the materials handling facility corresponding to the cluster 460. In some implementations, a grid 402 system, physical or virtual, is oriented with the shape of the materials handling facility (e.g., oriented with the walls of the materials handling facility). The grid 402 may be utilized to attach or mount cameras within the cluster 460 at defined locations with respect to the physical space of the materials handling facility. For example, in some implementations, the cameras may be positioned at any one foot increment from other cameras along the grid.

By mounting the cameras overhead at defined locations along the grid, the cameras can be associated with physical coordinates within the materials handling facility. For example, if the cluster 460 represents the north-west corner of a materials handling facility, the grid 402 may be segmented into columns and rows and cameras may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one foot increments, the physical location within the materials handling facility of every grid intersection and any connected cameras is known. In this example, camera 408A is positioned at grid coordinate B:3, which corresponds to the horizontal coordinate of the camera being positioned approximately two feet by three feet from the origin (in this example the upper left corner) of the cluster.

Because the field of view 404 of the cameras 408 may not by circular, the cameras may be placed at defined directions (e.g., 0, 90, 180, 270 degrees). The direction of the camera may be determined based on the field of view 404 coverage of adjacent cameras and/or the layout of objects on the surface of the materials handling facility. For example, if the camera 408 is being mounted above an aisle between two inventory locations, the direction of the camera may be set so that the larger portion of the field of view 404 of the camera covers the length of the aisle.

The height of the cameras from the surface, the distance between camera placement and/or direction of the cameras 408 within the cluster 460 may vary depending on the layout of the materials handling facility, the lighting conditions in the cluster, the volume of users expected to pass through a portion of the cluster, the activities and/or volume of activities expected to occur at different locations within the cluster, etc. For example, cameras may typically be mounted horizontally every three to four feet in one direction and every four to five feet in another direction along the grid 402 so that the field of view of each camera overlaps, as illustrated in FIG. 4.

In some implementations, the height of the cameras from the surface and the distance between cameras may be set so that their fields of view intersect and begin to overlap approximately seven feet above the surface of the materials handling facility. Positioning the cameras so that the fields of view overlap at approximately seven feet will result in the majority of users being within a field of view of a camera at all times. If the field of view of the cameras did not overlap until they were approximately three feet above the surface, as a user moves between the fields of view, the portion of the user that is taller than approximately three feet would exit one field of view and not enter the next field of view until the user has moved into that range of the camera. As such, a portion of the user is not detectable as they transition between fields of view. Likewise, by overlapping the fields of view of multiple cameras, each of the overlapping cameras may capture images that include representations of the user from slightly different perspectives. This image data may be combined and utilized to develop a three dimensional, or partially three dimensional model, or user pattern, of the user.

While this example describes overlapping camera fields of view at approximately seven feet above the surface of the materials handling facility, in other implementations, the cameras may be positioned so that the fields of view begin to overlap at different heights (e.g., six feet, eight feet).

In some areas of the cluster, such as cluster area 406, cameras 408 may be positioned closer together and/or closer to the surface area, thereby reducing their field of view, increasing the amount of field of view overlap, and/or increasing the amount of coverage for the area. Increasing camera density may be desirable in areas where there is a high volume of activity (e.g., item picks, item places, user dwell time), high traffic areas, high value items, poor lighting conditions, etc. By increasing the amount of coverage, the image data increases, thereby increasing the likelihood that an activity or action will be properly determined.

In some implementations, one or more markers 410 may be positioned throughout the cluster and used to aid in alignment of the cameras 408. The markers 410 may be placed at any location within the cluster. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers 410 may be placed on the surface of the materials handling facility. In other implementations, the markers 410 may be placed on a visible surface of an inventory location 430 within the cluster. In still other implementations, the inventory location 430 itself may be utilized as a marker. Alternatively, or in addition thereto, one or more inventory items that are viewable by the cameras may be used as the marker 410. In still other examples, the surface of the materials handling facility may have a detectable pattern, marks, defects, etc., that can be determined and used as markers 410 to align cameras.

In some implementations, the markers 410 may be temporarily placed at locations within the materials handling facility and used to calibrate the cameras. During calibration, the cameras may be aligned with respect to one another by aligning the position of the markers 410 in each camera's field of view. Likewise, the field of view of each camera may be determined and associated with coordinates of the materials handling facility.

The cameras 408 of a cluster may obtain images (still images or video) and process those images to reduce the image data and/or provide the image data to other components. As discussed further below, image data for each image or frame may be reduced to only include pixel information for pixels that have been determined to have changed. For example, baseline image information may be maintained for a field of view of a camera corresponding to the static or expected view of the materials handling facility. Image data for an image may be compared to the baseline image information and the image data may be reduced by removing or subtracting out pixel information that is the same in the image data as the baseline image information. Image data reduction may be done by each camera. Alternatively, groups of cameras may be connected with a camera processor that processes image data from a group of cameras to reduce the image data of those cameras.

Figure 5:
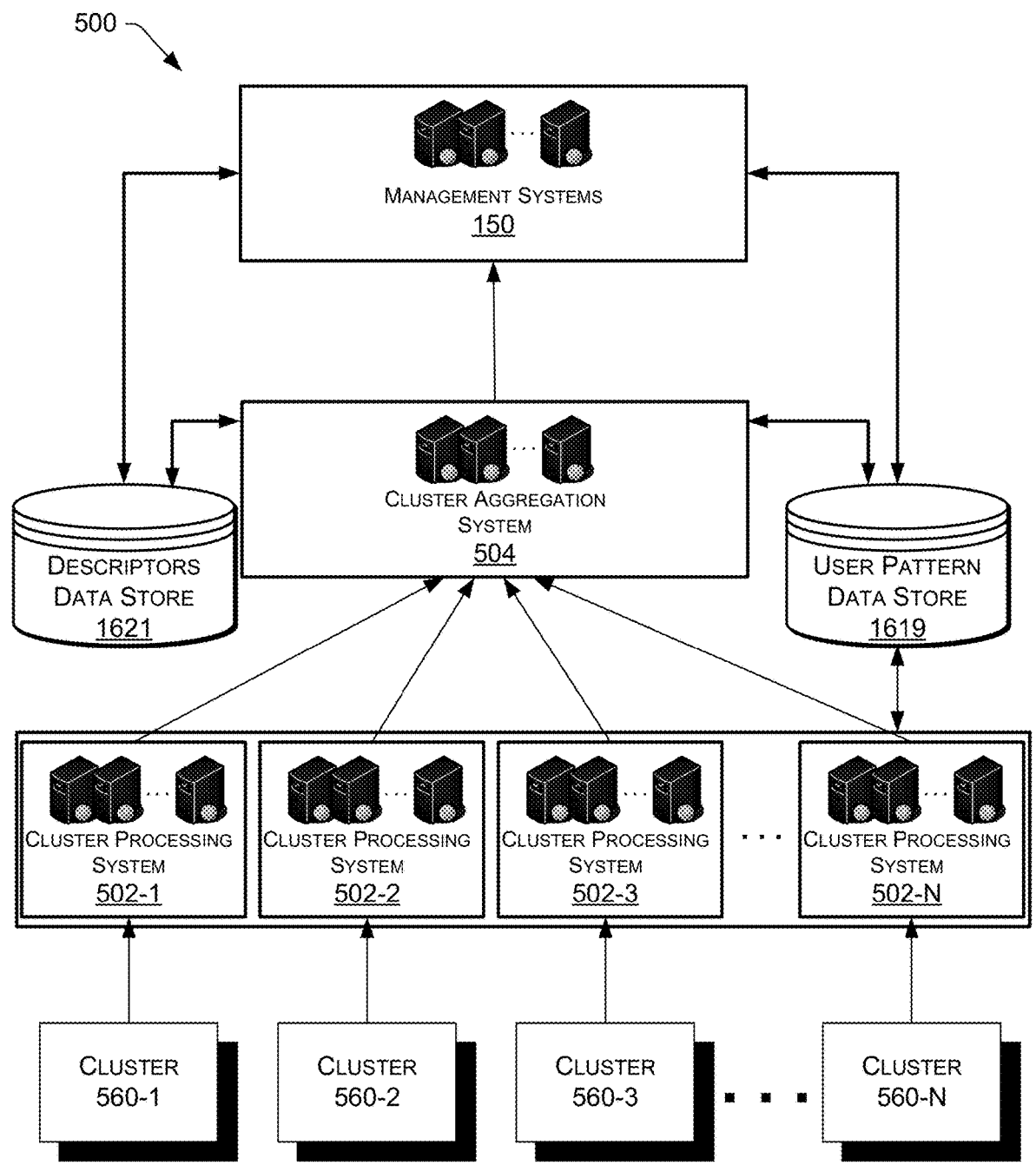
FIG. 5 is a block diagram of a camera hierarchy, according to an implementation.

FIG. 5 is a block diagram of a camera hierarchy 500, according to an implementation. The camera hierarchy 500 includes one or more clusters 560-1, 560-2, 560-3 . . . 560-N. Any number of cameras up to a maximum supportable by the cluster processing system may be included in each cluster 560. The maximum number of supportable cameras may be defined as the number of cameras that may be supported by a cluster processing system using a desired processing algorithm(s) without increasing the total processing time by more than a defined amount (e.g., 2%). Accordingly, the maximum number of cameras may vary based on the computation power and/or speed of the cluster processing system, the amount of image data provided by cameras of a cluster, the complexity and/or number of processing algorithms utilized to process the image data, etc. In some implementations, the maximum supportable number of cameras may be 400. Likewise, in some implementations, the number of cameras per cluster may vary between approximately 300 cameras and approximately 400 cameras.

Each camera and/or camera computing components may process image data to generate reduced image data. For example, baseline image information may be established for the field of view of each camera that identifies the temperatures, colors, shapes and/or depth information for objects (e.g., inventory locations, tables, work stations, surface area) that are typically within the field of view of the camera. As each image is obtained, the image data may be compared with the baseline image information to remove from the image data pixel information that is the same or similar in both the image data and the baseline image information. For example, the baseline image information may include pixel information for each pixel of image data that identifies the color values (RGB) of an object represented by the pixel, depth or distance of the object from the camera and/or the temperature of the object. The corresponding pixel information in the image data may be compared with the pixel information of the baseline image information to determine if the color values, depth, and/or temperature of the object has changed more than a tolerance threshold. Due to lighting changes, vibrations, temperature changes, etc., there may be some variation between the baseline image information and the image data. Such variations may fall below a threshold and not be considered as changes to the pixel information. The threshold may be any defined value and may be the same or different for different pixels, different cameras, different clusters, etc. Likewise, in some implementations, the threshold or comparison of the pixel information may be a delta comparison between values, a bitwise subtraction of the values, or another measure for determining variations.

If the difference between the pixel information of the baseline image information and the corresponding pixel information of the image data is below the tolerance threshold, it may be determined that there has been no change at that pixel. If there is no change, the pixel information is removed from the image data. This comparison may be done for each pixel represented in the image data, thereby removing any image data that has not changed compared to the baseline image information. By removing image data that has not changed, the size and amount of the image data to be transmitted and processed is greatly reduced. In some implementations, if there is no change in any of the image data when compared to the baseline image information, the camera or camera computing component may send an empty image data file. The empty image data file may be used to notify the other processing systems that the camera is operational but there is no change in the image data. In other implementations, the camera and/or the camera computing component may not send any information, or may simply send an indicator acknowledging that the camera is operational.

As discussed above, the fields of view of cameras within a cluster may overlap with other cameras of the cluster. Image data may be sent for each field of view and processed by the cluster processing system 502, as discussed further below. Likewise, the fields of view on the perimeter of each cluster may overlap with the fields of view of cameras of an adjacent cluster.

Each cluster processing system 502-1, 502-2, 502-3 . . . 502-N may correspond with a cluster. In some implementations, there may be a one-to-one relationship between clusters 560 of a materials handling facility and a cluster processing system 502.

Each cluster processing system may be remote from the materials handling facility and may include one or more computing systems, such as a server system 250, that is configured to process reduced image data received from a corresponding cluster 560. For example, cluster processing system 502-1 may process reduced image data received from each camera of cluster 560-1. Cluster processing system 502-2 may process reduced image data received from each camera of cluster 560-2. Cluster processing system 502-3 may process reduced image data received from each camera of cluster 560-3. Any number of cluster processing systems may be established to support and process reduced image data from any number of clusters.

Each cluster processing system receives reduced image data from each of the clusters 560, and further reduces the data by generating a point cloud representative of that portion of the materials handling facility. The position of each pixel represented in the point cloud is aligned according to coordinates (horizontal and vertical) of the materials handling facility. A point cloud is a three-dimensional mapping of objects represented by the reduced image data. For example, the reduced image data includes pixel information from a camera at a known position in the materials handling facility. Based on the known position of the camera, each pixel can be associated with horizontal coordinates of the materials handling facility. Likewise, the reduced image data may include depth information that can be utilized as the vertical component for the point cloud.

Utilizing the information from the generated point cloud, the cluster processing systems 502 can determine user patterns. For example, the vertical component of pixels represented in the point cloud identify changes in the height of a location within the cluster. Adjacent pixels (e.g., pixels of the same or similar area generated from prior images) may also be considered and, if there is a sufficient number of adjacent pixels with a similar change or increase in the vertical direction, it may be determined that those pixels represent a user pattern. For example, the user patterns 600 (FIG. 6A), 650 (FIG. 6B), 704, 706, 708, 712, 714, 716 (FIG. 7) may be determined based on a change in the vertical component of a group of pixels that make up the user pattern.

As discussed further below, in some implementations, descriptors, such as the size, shape, color, temperature, texture, texture pattern, patterns, etc., of the image data may also be considered in determining a user pattern and/or a user represented by a user pattern. For example, the cluster processing system 502 may consider information stored in the descriptor data store 1621 from prior point clouds generated from prior reduced image data. For example, if a user pattern and descriptors are determined in a prior point cloud based on reduced image data from the cluster at a similar location and/or having a similar size, shape, height, color, temperature, etc., that information may be stored in the user pattern data store 1619 and/or descriptor data store 1621 and utilized to determine the user pattern in the current reduced image data.

In still other implementations, the cluster processing system may utilize information received from the cluster aggregation system 504 to determine user patterns. For example, if a user is entering the field of view of cameras on the edge or perimeter of a cluster, the depth information for pixels of those cameras may begin to change. The cluster aggregation system 504 may provide information to the cluster processing system 502 identifying that a user pattern is expected to enter the cluster at defined locations based on information from other, adjacent clusters.

For each determined user pattern, the cluster processing system 502 generates position information and assigns a session identifier to the user pattern. The position information may include, for example, a center point of the user pattern, a position of a particular aspect of the user pattern (e.g., the user's head and/or shoulders), etc. The position information and corresponding session identifier is provided to the cluster aggregation system 504.

While the examples described herein discuss the use of pixel coordinates such as depth or vertical information for generating point clouds and determining user patterns, in other implementations, other information may be utilized in addition to or as an alternative to pixel coordinates for determining user patterns. For example, temperature information or heat signatures may be determined from reduced image data and utilized to determine a position of a user within the materials handling facility and/or to define a user pattern for a user. In another example, color changes may be utilized to determine a position of a user and/or to define a user pattern.

The cluster aggregation system 504 receives from each of the cluster processing systems 502 position information and session identifiers for each of the determined user patterns. The cluster aggregation system aggregates the information obtained from each of the cluster processing systems and generates a unified representation of the materials handling facility, determines users corresponding to each user pattern and provides that information to other systems, such as the inventory management system 150-1 (FIG. 1) or the user pattern management system 150-2 (FIG. 1), represented collectively in FIG. 5 as management systems 150.

In one implementation, the cluster aggregation system 504 may utilize the received position information for each user pattern and determine user patterns received from different cluster processing systems that overlap and/or represent the same user. As discussed above, the field of view of cameras within adjacent clusters may overlap to aid in monitoring the location of a user as they move through the materials handling facility. When the user moves between clusters, both cluster processing systems will provide user pattern position information for a period of time. The cluster aggregation system 504 receives this information and determines that the two user patterns are to be associated with a single user.

Likewise, for each user pattern, position information and session identifier, the cluster aggregation system 504 may determine a user identifier. The user identifier may correspond to the user represented by the user pattern. In some implementations, the cluster aggregation system 504 may maintain a session identifier mappings data store (not shown) that includes a mapping relationship between the session identifier(s) assigned by the cluster processing systems and the corresponding user identifiers. As each series of user location information and session identifiers is received from the cluster processing systems 502, the cluster aggregation system 504 correlates the session identifiers with the user identifiers and updates the location of the user within the materials handling facility.

The cluster aggregation system 504 may then provide user identifiers, location information and/or user pattern information for each user located within the materials handling facility to other systems, such as the management systems 150 (e.g., inventory management system, user pattern management system). For example, the user pattern management system may track the position of the user as they move through the materials handling facility and generate descriptors representative of the user that may be utilized to aid in tracking the user and/or re-establishing a tracking of the user, as discussed further below.

FIGS. 6A and 6B illustrate different views of a user pattern that may be determined for a user utilizing the implementations discussed herein. Specifically, FIG. 6A is a two-dimensional overhead view 602 of a user pattern 600 obtained from overhead cameras, according to an implementation. FIG. 6B is a side view 652 of a user pattern 650 obtained from overhead cameras, according to an implementation.

The two dimensional overhead view 602 illustrates the overhead view of the user pattern with horizontal position information (x, y) of the user pattern as determined from the image data obtained from the overhead cameras. The side view 652 illustrates a two-dimensional side view showing the depth information (y, z) of the user pattern 650 above a surface (e.g., floor) of the materials handling facility. The user patterns 600, 650 are established based on the depth values and horizontal pixel coordinates included in the image data obtained from the overhead cameras for the pixels that represent the user.

Utilizing the depth information and/or color values of the pixels that represent the user, a peak height 604, or approximate height, of the user pattern can be determined. For example, an initial classifier may be utilized by the cluster processing system to identify objects in the reduced image data. The peak height (highest height of a pixel) of the object may be determined and if the peak height is above a height threshold, it may be determined that the object is a user. In some implementations, the object may be tracked over a series of frames/images or for a defined period of time before it is determined whether the object is a user. In such an example, the movement of the object and/or the average peak height for each objected detected in each frame of the reduced image data may be considered in determining whether the object is a user.

In some implementations, descriptors representative of the user pattern, or segments thereof, may likewise be determined. Descriptors include, but are not limited to a height of the user or the user pattern, a shape of the user or the user pattern, a size of the user or the user pattern, a width of the user or the user pattern, a facial feature of the user, a color histogram representative of at least a portion of the user or the user pattern, a color of an item of clothing worn by the user, a facial feature of the user, a length of a body part of the user, a color pattern of an item of clothing, a texture of the user pattern, a posture of the user or the user pattern, a pose of the user or the user pattern, a gait of the user or the user pattern, or a speed of movement of the user or the user pattern.

Color information of the object may be determined based on the color values of pixels representing the object. Likewise, color values of the pixels representing the user pattern may be determined. In some implementations, the user pattern may be segmented into descriptor regions and descriptors determined for each descriptor region. The descriptor regions may be independent and/or may overlap with other descriptor regions. For example, a user pattern may be segmented into a head descriptor region, a torso descriptor region, a lower body descriptor region, and/or the user pattern as a whole may be a descriptor region. Segmenting a user pattern includes associating sets of image data with different descriptor regions.

The descriptor regions may be determined based on the shapes of the user pattern, edge detection, object detection, etc. In some implementations, the descriptor regions may be determined based on a determined height 604 of the user pattern. Utilizing anthropometry, the user can be segmented into different regions corresponding to different segments of the user. Each descriptor region may be defined as a set of image data having coordinates (depth data) between two percentages of the determined approximate height of the user. For example, referring to FIG. 6B, the head descriptor region 606 may be defined as the set of image data having coordinates between one-hundred percent of the approximate height of the user and approximately eighty-two percent of the approximate height of the user. The torso descriptor region 608 may be defined as the set of image data having coordinates between approximately eighty-two percent of the approximate height of the user and approximately fifty-three percent of the approximate height of the user. The lower body descriptor region 610 may be defined as the set of image data having coordinates between approximately fifty-three percent of the approximate height of the user and approximately zero percent of the approximate height of the user.

The descriptor regions may be defined in both the vertical and horizontal components as a percentage of the approximate height of the user. For example, the torso descriptor region may also be defined as the set of image data having horizontal coordinates that are centered about the approximate peak height of the user (the center of the head) and approximately thirteen percent of the approximate height of the user in both directions along the x-axis. Likewise, the set of image data having coordinates along the y-axis may be similarly defined, defined based on a percentage of the approximate height of the user corresponding to an approximate arm length of the user (in this example, approximately forty-four percent of the approximate height of the user), or based on other factors.

As discussed below, descriptors may be determined for each descriptor region and stored in the descriptor data store. The descriptors may be aggregated over time as the user moves through the materials handling facility and may be used to confirm other detections of the user and/or to rediscover the user if tracking of the user is lost while the user is located in the materials handling facility.

While the example illustrated in FIGS. 6A, 6B illustrate a head, torso and lower body descriptor regions, additional and/or fewer descriptor regions may be determined for a user pattern. For example, descriptor regions may include a head descriptor region, a torso descriptor region, a lower body descriptor region, a leg of the user, an arm of the user, the entire user, etc.

FIG. 7 is a block diagram of a two-dimensional overhead view of an inventory area 730 and multiple user patterns 704, 706, 708, 712, 714, 716, according to an implementation. As discussed above, the user patterns 704, 706, 708, 712, 714, 716 are determined by processing image data obtained from cameras located above the inventory area 730. As users move throughout the materials handling facility, they may interact with items, pick items from inventory locations, place items at inventory locations, move items, and/or perform other events.

During a period of time, such as while a user is located in a materials handling facility, the user pattern and/or descriptors may be periodically determined with each series or frame of images. The user patterns may be determined to correspond to the same user based on the proximity of the user patterns over the period of time, a predicted trajectory or direction of movement of the user based on the tracked positions of the user over the period of time, a similarity between the descriptors of each user pattern, etc.

In some implementations, it may also be determined whether the position associated with a user pattern is within a defined distance of a position associated with a user pattern of another user. If the position associated the user pattern is not within the defined distance of a user pattern of another user, the user pattern may be added to the user patterns associated with the user stored in the user pattern data store. Likewise, the determined descriptors may be stored in the descriptor data store and added to the other stored descriptors representative of the user and/or the user pattern. By aggregating the user patterns for a user determined during a period of time, the different positions, shapes, orientations, etc. of the user, as represented by the user patterns may be used to establish a more robust user pattern data store that may be used to detect the user and/or re-establish a tracking of a user. Similarly, by aggregating the descriptors during a period of time, the different positions, shapes, colors, orientations, etc., of the descriptors may be used to establish a more robust descriptor data store that may be used to detect the user and/or re-establish a tracking of a user.

If it is determined that the position associated with the user pattern is within a defined distance of the position associated with another user pattern representative of another user, the user pattern may not be added to the data store and the descriptors of the user pattern may not be added to the descriptor data store. Instead, the aggregated user patterns of the user and/or the aggregated descriptors of the user may be utilized to aid in the detection of the user.

For example, it may be determined that the user pattern 714 is within a defined distance of user pattern 716 and likewise, user pattern 716 is within a defined distance of user pattern 714. To aid in the detection and tracking of each user represented by user patterns 714, 716, the user patterns 714, 716 obtained from the reduced image data and/or the corresponding descriptors may be compared with stored user patterns and/or stored descriptors associated with the user represented by the user patterns 714, 716. For example, if the user represented by user pattern 714 is six feet four inches tall and weighs two-hundred pounds and the user represented by user pattern 716 is also six feet four inches tall and weighs two-hundred pounds, it may be difficult to distinguish between the two user without considering additional information, such as the descriptors, direction of travel, prior position information, etc. For example, if the user represented by the user pattern 714 is wearing a yellow shirt and the user represented by the user pattern 717 is wearing a black shirt, the descriptors for the torso descriptor regions of each user pattern may be determined and compared with stored descriptors associated with each user pattern to aid in disambiguating between the two user patterns and properly associating each user pattern with the correct user.

As another example, it may be determined that the position associated with user pattern 704 is beyond the defined distance of another user pattern. In such an example, there is limited risk of improperly identifying the user pattern and a strong confidence score may be determined that the user pattern and corresponding descriptors represent the user. In such an example, the determined user pattern may be added to the user pattern data store and the descriptors may be added to the descriptor data store and associated with the user.

Figure 8:
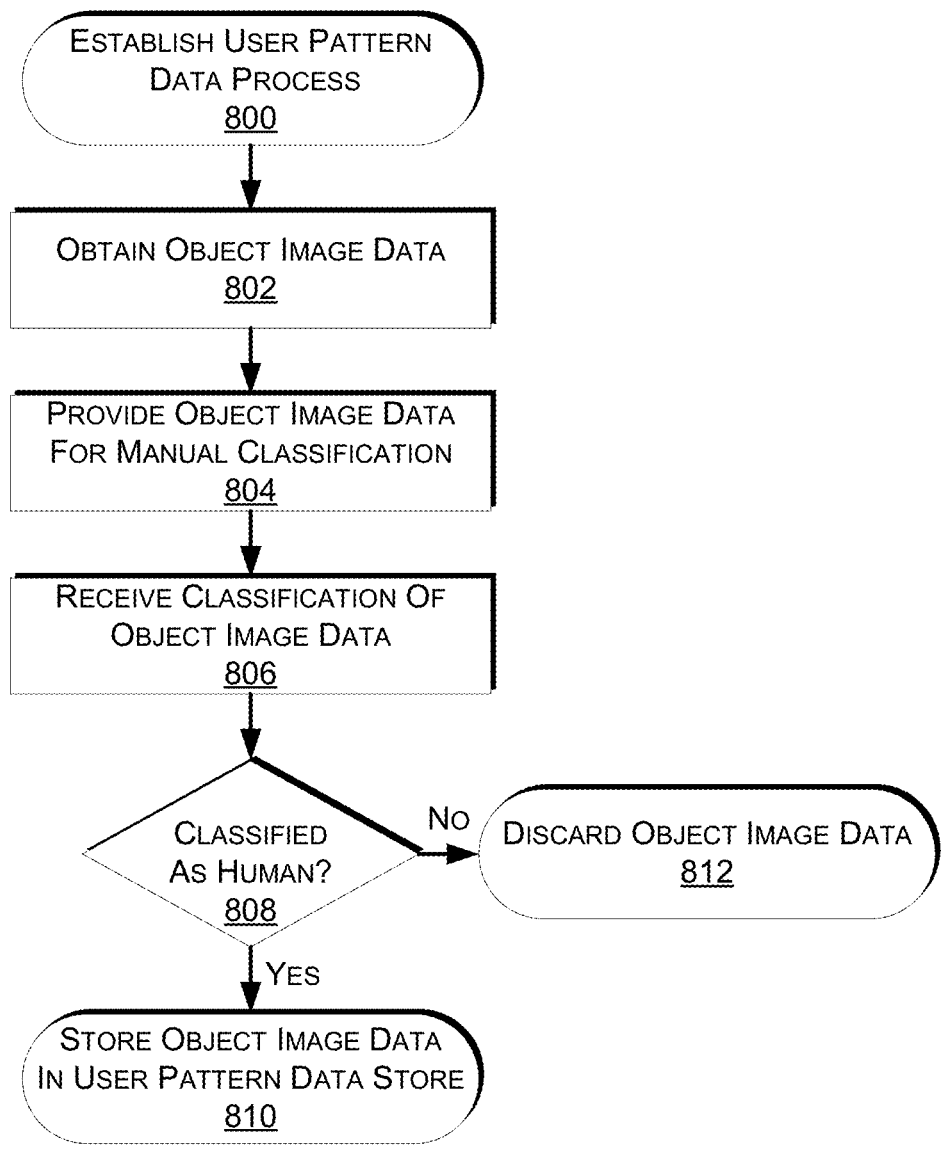
FIG. 8 is a flow diagram of an example process for establishing a user pattern data set for detecting a user pattern, according to an implementation.

FIG. 8 is a flow diagram of an example process 800 for establishing a user pattern data store for use in determining that an object is a user, according to an implementation. The example process of FIG. 8 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional.

The example process 800 beings by obtaining object image data representative of an object, as in 802. As discussed above, the object image data may be obtained from the reduced image data as the reduced image data is representative of pixels having an associated depth value that is different than the background image data. In other implementations, the object image data may be images known to include objects (e.g., users, carts, totes, etc.). In some implementations, the data set may be established by processing approximately ten thousand objects represented by object image data using the example process 800 to establish a user pattern data set that is maintained in the user pattern data store to determine if an object is a user.

Obtained object image data is provided for manual classification, as in 804. Manual classification may include one or more individuals manually reviewing the image and determining whether the object represented in the image is a user or not a user. For example, images of objects may be sent to a large number of individuals (e.g., crowd sourcing) and those individuals may be asked to classify the object represented in the image as human or non-human, user or non-user, etc. The classification may be a simple yes/no classification or any other form of classification that indicates whether the object represented in the image is a user. In other implementations, the classification may also identify the shapes of the user pattern, such as the head and shoulders, and/or the orientation of the user. In response to providing the object image data for manual classification, a classification is received, as in 806.

A determination is then made as to whether the object is classified as human, as in 808. In some implementations, multiple classifications may be received for a same image of an object and the determination may be made based on a majority of the classifications received from the manual classification. If the object is classified as non-human, the object image data is discarded and not added to the user pattern data store as representative of a user pattern, as in 812. Image data may be discarded by, for example, deleting the image data from memory, deprecating the image data, flagging the image data as invalid, etc. In another implementation, the object image data may be stored and utilized as a representation of an object that is not a user.

If it is determined that the object is classified as human, the object image is stored in the user pattern data store as representative of a user pattern, as in 810.

The object image data store, once established, may be utilized to determine if an unknown object is a user, alone or in conjunction with other factors. For example, the object image data store, once established with a sufficient number of user patterns representative of users of different sizes and shapes, wearing hats, not wearing hats, with glasses, without glasses, etc., may be used as a comparison for determining, based on the size, shape, etc., of an object, whether the object is a user. Other factors may include tracking the movement of the object over a period of time, determining whether a peak height of the object exceeds a minimum height threshold, etc.

Figure 9:
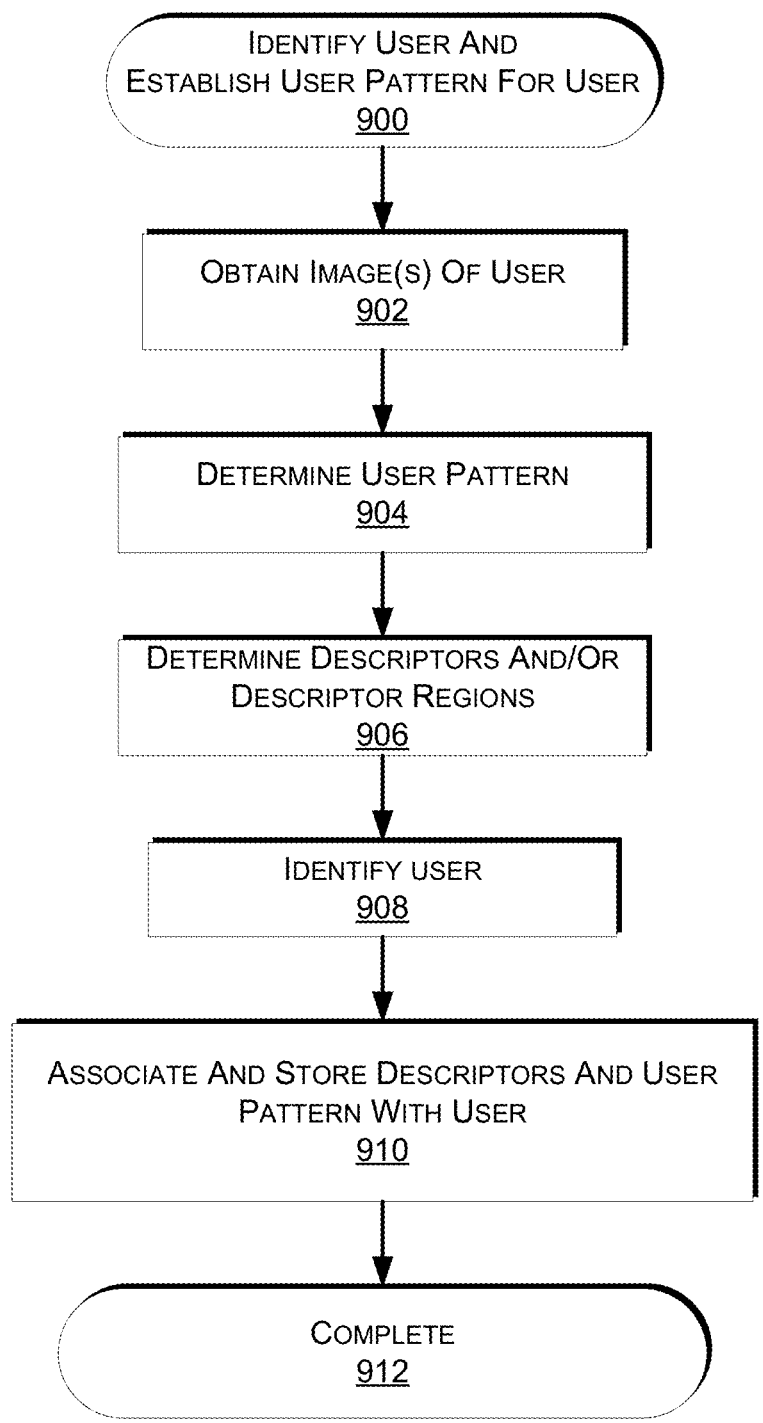
FIG. 9 is a flow diagram of an example process for identifying a user and establishing a user pattern representative of the user, according to an implementation.

FIG. 9 is an example process for identifying a user when the user arrives at the materials handling facility, establishing a user pattern for the user and determining a plurality of descriptors for the user, according to an implementation. The example process 900 begins by obtaining an image of a user as they arrive or enter the materials handling facility, as in 902. For example, in some implementations, there may be one or more dedicated check-in or entry locations. As the user arrives at the check-in location or passes through the entry location, one or more images of the user may be obtained. In some implementations, images of the user may be obtained from overhead with a camera posited above the user and oriented straight down, similar to the positioning discussed above for cameras of a cluster.

For example, a camera may be positioned at a defined location within the materials handling facility at a known distance above the surface of the materials handling faciltiy. When the user is located in the field of view of the camera, one or more images of the user may be obtained. The corresponding image data may include RGB color information for each pixel, coordinate information (e.g., horizontal coordinates and depth information), temperature information, etc.

Utilizing the obtained image, a user pattern representative of the user is determined, as in 904. For example, the image data may be processed to determine an approximate height, an approximate size, and/or an approximate shape of the user. In some implementations, a maximum or peak height of the user may be determined along with a size, orientation, and/or shape of the user's head and/or shoulders. The user pattern may be determined from the one or more images or may be established over a period of time. For example, while the user is being authenticated or identified, a series of images or video may be obtained and those images may be processed to determine the user pattern, which may include the approximate height, size, shape, color, texture, etc. representative of the user.

The image data may also be processed to determine descriptors that may be utilized to aid in a tracking or re-identification of the user, as in 906. For example, if the user is wearing a bright colored shirt (e.g., yellow shirt), the color of the shirt may be a descriptor that may be used to aid in tracking the position of the user within the materials handling facility. In some implementations, the user pattern may be segmented into one or more descriptor regions. For example, anthropometry percentages may be utilized to segment the user pattern into descriptor regions based on percentages of the peak height determined for the user pattern. For example, as discussed above, image data of the user pattern may be segmented into a torso region, a head region, etc. A descriptor may be determined for each descriptor region.

A descriptor may be any feature of the user, the user pattern, or the descriptor region. For example, an HSV color histogram, which represents a distribution of colors, may be determined for each descriptor region based on the color values of the pixels located in that descriptor region. As another example, the descriptor may be a size, shape, volume, color pattern, texture, facial feature, etc. of the user, or a portion of the user represented by the user pattern.

In addition to generating a user pattern and determining one or more descriptors, the user is also identified, as in 908. User identification may be accomplished using a variety of techniques. For example, images of the face of the user may be obtained and processed using facial recognition algorithms, pattern matching algorithms, or the like, to identify the user. Alternatively, or in addition thereto, the user may provide an identification (e.g., user name, password), the user may present an identifier (e.g., identification badge, card), a RFID tag in the possession of the user may be detected, a visual tag (e.g., barcode, bokode, watermark) in the possession of the user may be detected, biometrics may be utilized to identify the user, etc.

Upon user identification, the user pattern and any descriptors are associated with a user profile and corresponding user identifier, as in 910. The user pattern may be stored in the user pattern data store and the descriptors may be stored in the descriptors data store. Likewise, a session identifier may be generated and associated with the user profile, the user pattern and/or the descriptors. In some implementations, the session identifier may be utilized to identify the user profile and the user identifier may be provided by the cluster aggregation system to other systems. In some implementations, the actual identity of the user may not be discernable from the session identifier and/or the user identifier. In such an implementation, only systems that need access to the actual user information may be able to use the session identifier and/or user identifier to obtain access to user information.

Upon user identification and association with a user profile, the example process 900 completes, as in 912.

Figure 10:
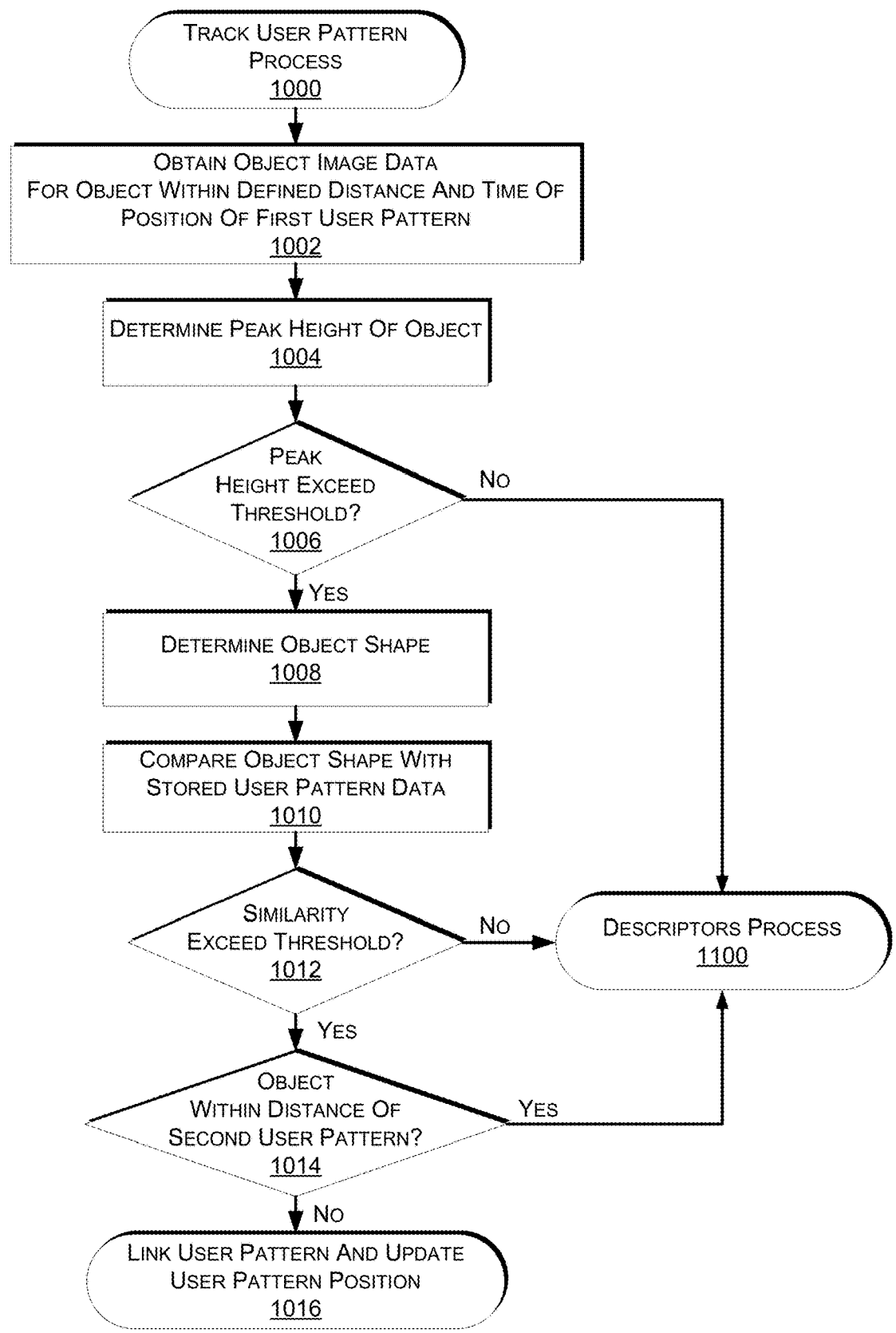
FIG. 10 is a flow diagram of an example process for tracking a user pattern, according to an implementation.

FIG. 10 is a flow diagram of an example process 1000 for tracking a user pattern, according to an implementation. The example process 1000 may begin as soon as a user has been identified and an initial user pattern and/or descriptors established according to the example process 900. When the example process 1000 initiates, object image data is received for an object that is within a defined distance and time of a position associated with a first user pattern, as in 1002. For example, if the user has been identified and a user pattern established (e.g., first user pattern) according to the example process 900, the object image data received by the example process 1000 may be a representation of the user at a second time.

As discussed above, image data may include color values and coordinates (horizontal and depth) for each pixel of the image included in the image data. The defined distance may be any distance that a user may possibly travel during the defined time. Likewise, the defined time may be any period of time. In one implementation, the defined time may be one second and the defined distance may be one foot.

Utilizing the obtained image data, a peak height of the object is determined, as in 1004. In one implementation a classifier is utilized to process the depth values associated with each pixel to identify a peak height of the object represented in the object data. For example, if the depth values identify a distance between the portion of the user represented by the pixel and the camera that obtained the image, the peak height may be identified as the pixel that has a depth value of a shortest distance to the camera. In another example, a height may be determined for each depth value. The height is computed as the difference between a known distance between the camera and the surface of the materials handling facility and the depth value. The peak height may then be identified as the pixel having the highest height value. In another implementation, the classifier may process cells or groups of pixels to quickly identify an area that includes a peak value.

Based on the peak height, a determination is made as to whether the peak height exceeds a user pattern height threshold, as in 1006. The user pattern height threshold may be a minimum value for any user pattern. For example, the peak height may be four feet. If the peak height exceeds the threshold, the object may be initially considered a potential user. If the peak height does not exceed the threshold, the object may initially not be considered a potential user.

While this example, describes utilization of a peak height for initial determination if the object is potentially a user, in other implementations, other features and/or considerations may be utilized to initially determine if the object is potentially a user. For example, a shape of the object may be initially considered in addition to or as an alternative to the peak height of the object.

If it is determined that the peak height exceeds the user pattern height threshold, a shape of the object is determined, as in 1008. The shape of the object may be determined using a more detailed classifier that processes a higher density of pixels of the image data to determine shapes of the object. For example, the classifier may be a Gaussian classifier that processes the coordinates (horizontal values and/or depth values) associated with the pixels to determine whether the object includes a head shape and/or shoulder shapes. In one implementation, the classifier may utilize the user pattern data store, established as discussed above with respect to FIG. 8, to compare determined shapes of the object with shapes of the stored user pattern data, as in 1010. Likewise, the shapes of the object may be compared with the user pattern data stored for the user that were established at a prior point in time (e.g., when the user was first identified according to the example process 900, or at a prior time using the example process 1000).

In comparing the determined shapes of the object with the stored user pattern data, a similarity score is determined identifying a similarity between the determined shapes of the object and the shapes of the stored user pattern data. The similarity score may be determined using a Hungarian matching algorithm, feature matching algorithm, or the like to determine a similarity between the image data and the stored user patterns.

A determination is also made as to whether the similarity score exceeds a similarity threshold, as in 1012. For example, if the user pattern is processed and determined to have shapes that are similar to the head and shoulder shapes of one or more stored user patterns, it may be determined that the object has a high similarity score. In comparison, if the object is a tote it will not be determined to have a head shape and a shoulder shape that is similar to the head shape and shoulder shape of a stored user pattern and will thus have a low similarity score. The similarity score may be any type of identifier that can be used to indicate a similarity between the determined object and stored data. For example, the similarity score may be a numerical value, a yes/no indicator or flag, etc.

The similarity threshold, and each of the other thresholds discussed herein, may be any defined value and may be different for different users, different areas within the materials handling facility, different times of day, etc. Like the other thresholds described herein, the similarity threshold may also be another form of measuring or comparing values. For example, the threshold may represent a delta comparison between values, a bitwise subtraction, or the like.

If it is determined that the similarity score exceeds the similarity threshold, a determination is made as to whether the object is within a defined distance of a second user pattern, as in 1014. The defined distance may be any distance. In some implementations, the defined distance may be the same defined distance discussed above with respect to block 1002. If the object is within a defined distance of a second user pattern, it may be determined that there are potentially two or more users near one another. In such an instance, additional analysis may be performed before the object is confirmed to be a user, linked to the first user pattern and associated with the user. In comparison, if it is determined that the object is not within a defined distance of a second user pattern, the object is determined to be a user, the user pattern is linked to the first user pattern and the corresponding user and a position of the user and the first user pattern is updated to match the position of the object, as in 1016. The object may be linked to the first user pattern and/or the user by associating a session identifier with the object. In some implementations, an expected trajectory, gate or speed of the user may likewise be determined based on the trajectory of linked user patterns and/or the distance and time between each linked user pattern.

Figure 14:
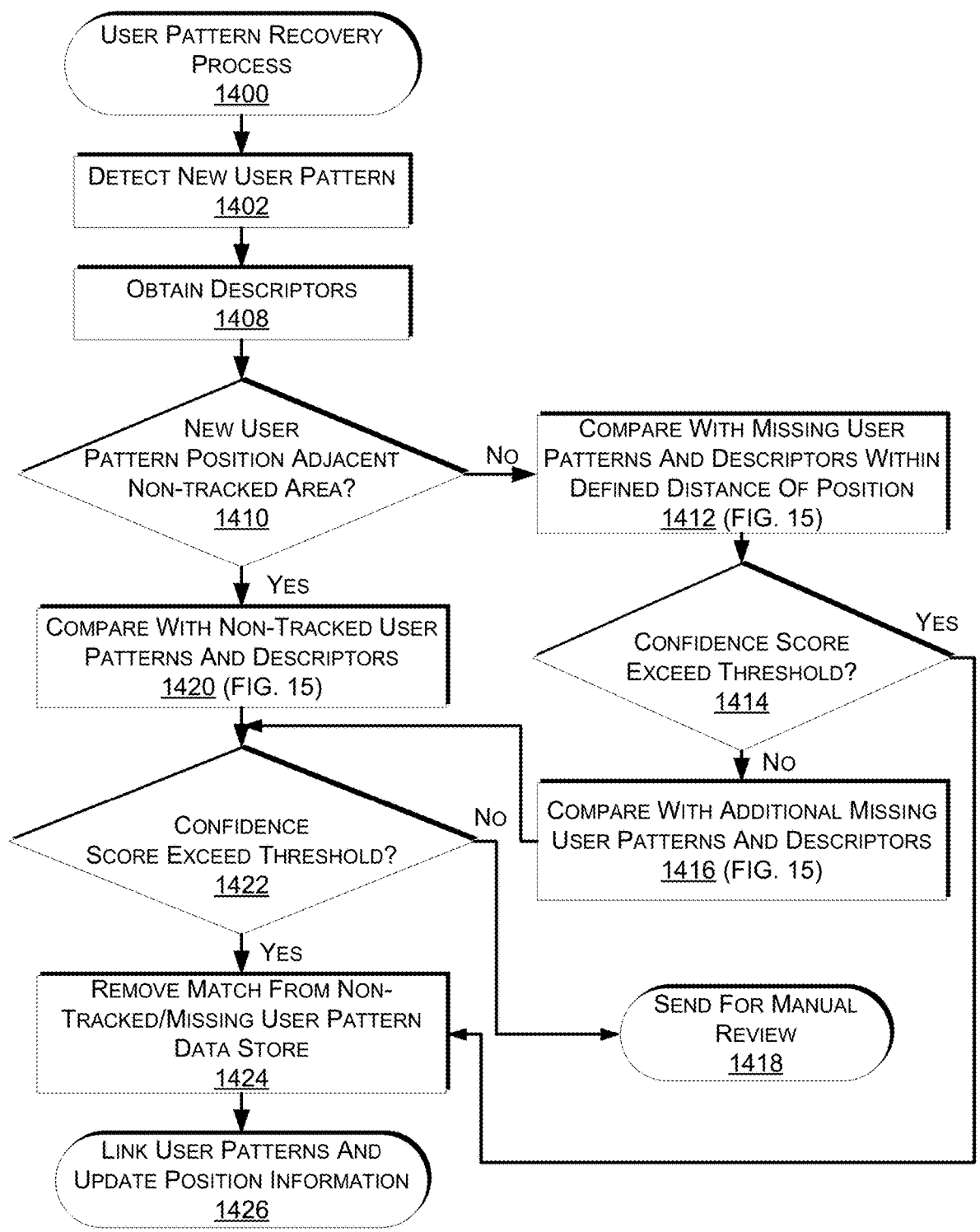
FIG. 14 is a flow diagram of a user pattern recovery process, according to an implementation.

If it is determined that the peak height does not exceed the user pattern height threshold (decision block 1006), that the similarity score does not exceed the similarity threshold (decision block 1012), or if it is determined that the object is within a defined distance of a second user pattern (decision block 1014), the descriptors process 1100 may be performed to determine if the object is a user pattern. The descriptor process 1100 is discussed below with respect to FIG. 11. In another implementation, rather than utilizing the descriptor process 1100, in some implementations, if the position of the user is not updated, the tracking of the user may be considered lost and the example process may proceed to the recovery process 1400 (FIG. 14).

Figure 11:
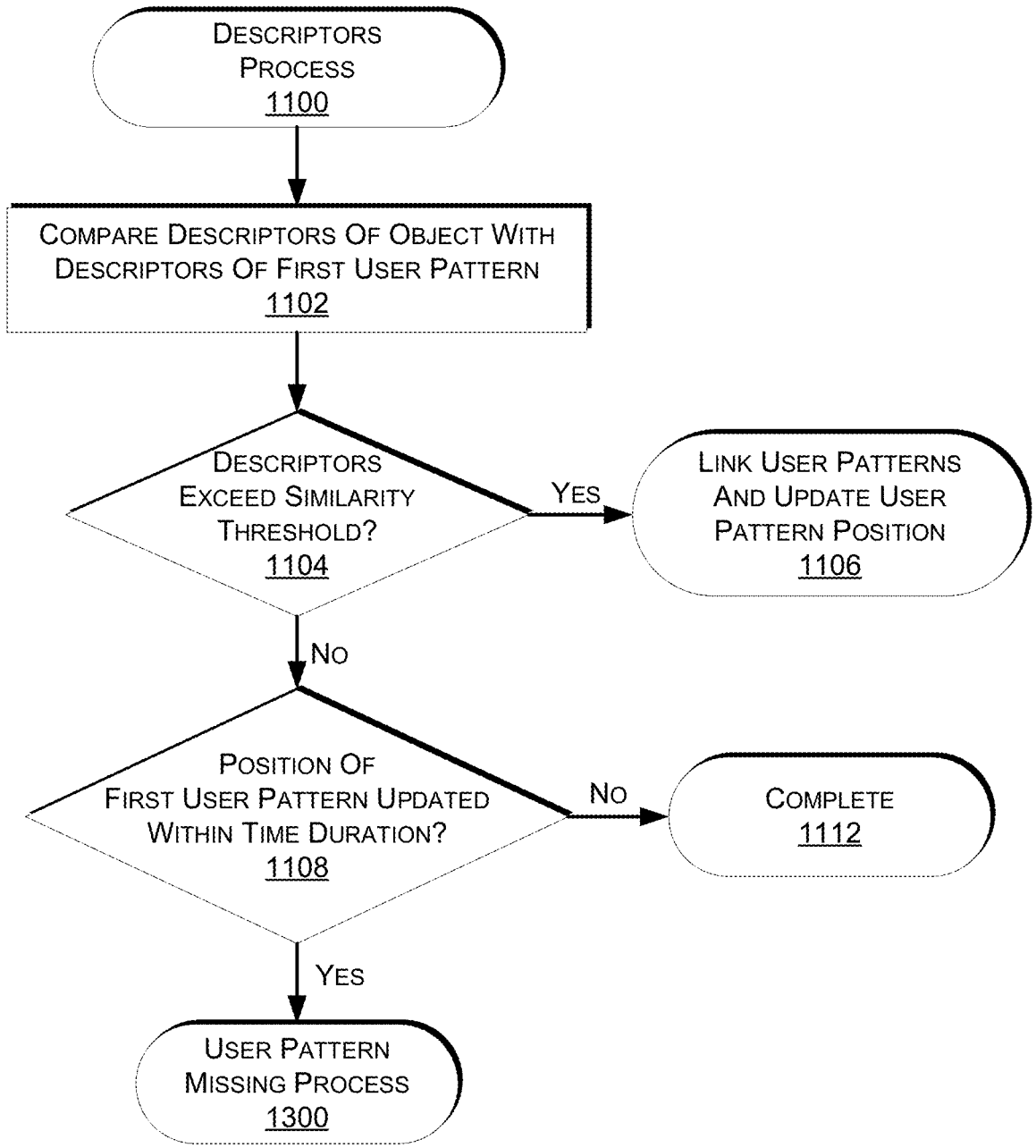
FIG. 11 is a flow diagram of an example descriptors process, according to an implementation.

FIG. 11 is a flow diagram of an example descriptors process 1100, according to an implementation. As discussed above, descriptors may be determined and stored in a descriptor data store for user patterns and/or descriptor regions of user patterns. Likewise, descriptors may be determined for object image data that is being processed to determine if the object is a user. For example, one or more descriptors for the object may be generated. In some implementations, the object may be segmented into descriptor regions based on the determined peak height of the object or approximate height of the user. As discussed above, segmenting includes associating sets of image data with different descriptor regions based on the coordinates associated with the image data.

The descriptors for the object may then be compared to the stored descriptors for the first user pattern, as in 1102. For example, the descriptors may include color values or color histograms of the object and/or descriptor regions of the object. A Hungarian algorithm (Hungarian Method) or other matching process may be used to determine a similarity between the object descriptors and the stored descriptors of the first user pattern. The comparison of the descriptors may result in a descriptor similarity score identifying how similar the descriptors of the object are to the stored descriptors of the first user pattern.

A determination may then be made as to whether the descriptor similarity score exceeds a descriptor similarity threshold, as in 1104. Like the other thresholds, the descriptor similarity threshold may be any value and may vary for different users, different user patterns, different locations within the materials handling facility, etc.

If it is determined that the similarity score exceeds the similarity threshold, the object may be determined to be a user pattern representative of the user and the object may be linked to the first user pattern, as in 1106. Likewise, the position of the first user pattern may be updated to match the position of the object.

In some implementations, it may also be determined whether the object corresponds to a predicted trajectory of the first user pattern. For example, as the user pattern is tracked through the materials handling facility and each determined user pattern linked, a predicted trajectory may be determined. In addition to considering the object shape and/or descriptors, the position of the object may be considered as a factor in determining whether the object is a user pattern representative of the user.

If it is determined that the similarity score does not exceed a threshold, it may be determined if the position of the first user pattern has been updated within the time duration, as in 1108. The time duration may be any defined time. For example, the time duration may be five seconds. If it is determined that the position of the first user pattern has not been updated within the time duration, it may be determined that tracking of the user represented by the first user pattern has been lost and the user missing process 1300 (FIG. 13) may be performed. If it is determined that the position of the user pattern has been updated within the time duration, the example process 1100 completes, as in 1112.

The example processes 1000 (FIG. 10) and 1100 (FIG. 11) may be periodically or continuously performed to track a user as they move through the materials handling facility. For example, the first user pattern, as discussed with respect to FIGS. 10-11, may be the user pattern determined during a prior iteration of the example processes 1000 and/or, 1100. In one implementation, image data may be obtained at a rate of fifteen frame per second and those frames may be processed to determine an object, compare that object to a first user pattern of the user, determine if the object is representative of the user and update the position of the user. The processes 1000, 1100 may then repeat for the next frame.

In addition to determining if an object is a user, in some instances, the determined user pattern and/or descriptors may be added to the user pattern data store and/or descriptors data store representative of the user and utilized as stored user pattern data and descriptor data to continue tracking the user.

Figure 12:
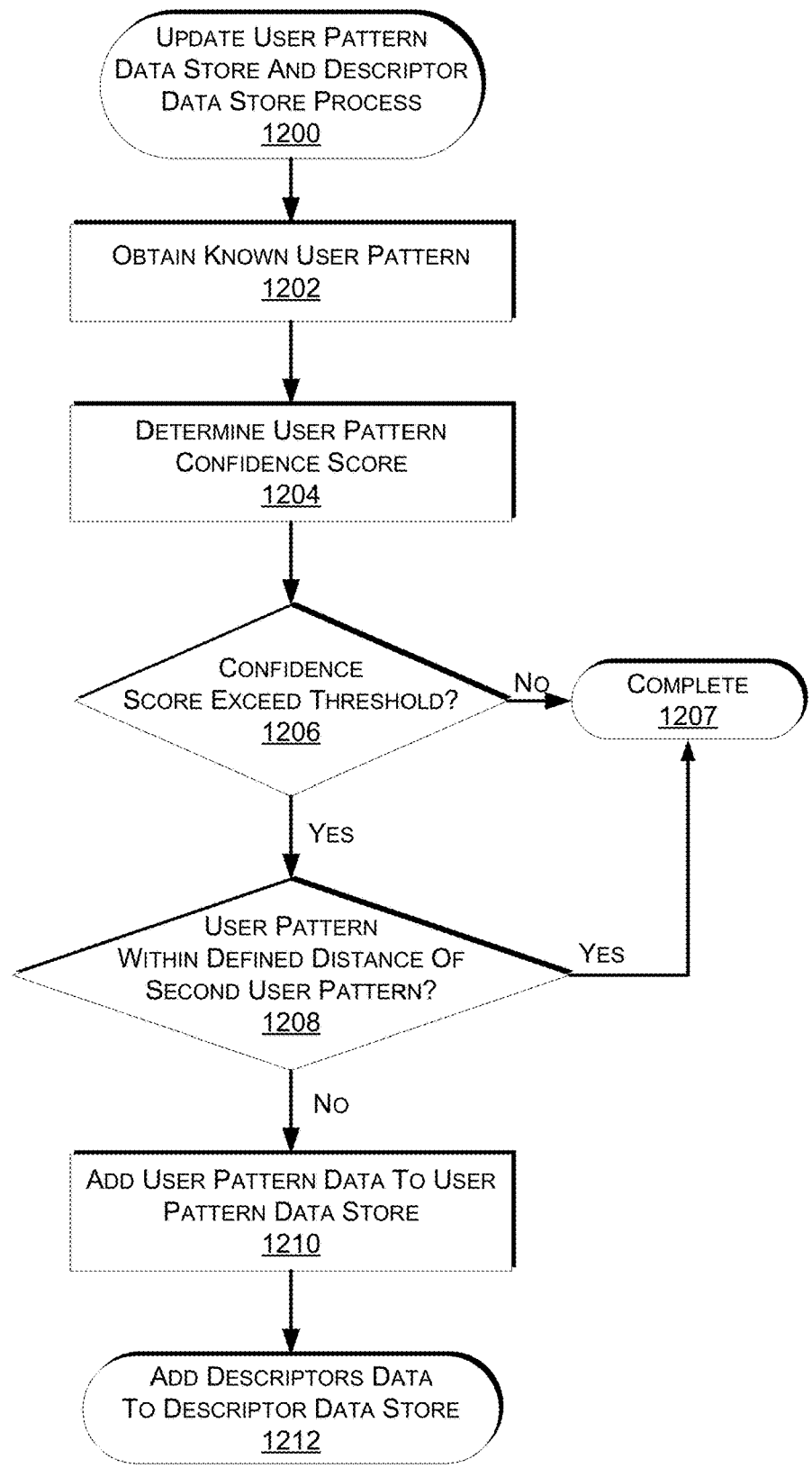
FIG. 12 is a flow diagram of an example process for updating a user pattern data store and a descriptor data store, according to an implementation.

For example, FIG. 12 is a flow diagram of an example process 1200 for updating a user pattern data store and a descriptor data store for a user that is being tracked through the materials handling facility, according to an implementation. The example process 1200 begins by obtaining a known user pattern that is representative of a user, as in 1202. For example, when an object is determined to be a user as part of the example processes 1000, 1100, the user pattern representative of the object may be a known user pattern. A confidence score may then be determined that represents a confidence level that the known user pattern is a good representation of a user pattern for the user. For example, if it was determined at decision block 1006 (FIG. 10) that the user pattern does not exceed the user pattern height threshold, even though the user pattern was ultimately determined to be representative of the user, it may be determined that the user pattern has a low confidence score because it is not a good representation of the user.

A determination may be made as to whether the confidence score exceeds a confidence threshold, as in 1206. If it is determined that the confidence score does not exceed the confidence threshold, the example process 1200 completes, as in 1207. In some implementations, there may be no determined confidence score and any user pattern may be processed according to the following blocks (1208-1212) of the example process 1200.

If it is determined that the confidence score exceeds a threshold, or if no threshold is utilized, a determination is made as to whether the position associated with the user pattern is within a defined distance of a position of a second user pattern, as in 1208. If it is determined that the user pattern is within a defined distance of a second user pattern, meaning that two users are within a defined distance of one another, the example process 1200 completes, as in 1207. However, if it is determined that the user pattern is not within a defined distance of a second user pattern, the user pattern representative of the user is added to a user pattern data store that includes user pattern data representative of the user, as in 1210. The user pattern data stored in the user pattern data store that is representative of the user may be only temporarily stored and used while the user is located in the materials handling facility. In other implementations, the user pattern data stored in the user pattern data store that is representative of the user may persist and be utilized at any time the user is located in the materials handling facility.

In some implementations, the user pattern may also be added to the user pattern data store of user pattern data that is established as discussed above with respect to FIG. 8 and utilized to determine whether an object is a user pattern. By periodically or continually adding or aggregating user pattern data with other confirmed user pattern data, the user pattern data store becomes more robust and is able to detect a larger range of different sizes and/or shapes of users. Likewise, in some implementations, user pattern data stored in the user pattern data store may decay over a period of time and/or newer user pattern data may have a higher weighting to account for changes in user patterns over a period of time. For example, during the summer months, user patterns may appear different than during winter months due to the difference of clothing worn during those different seasons.

In addition to updating the user pattern data store(s), the descriptors determined as representative of the user pattern may be added to the descriptor data store for the user, as in 1212. The descriptors stored in the descriptor data store that are representative of the user may be only temporarily stored and used while the user is located in the materials handling facility. By periodically or continually adding or aggregating descriptors determined while a user moves around the materials handling facility, a larger sample of descriptors representative of the user may be obtained. The larger sampling of descriptors may improve the detection or confirmation that an object corresponds to a particular user pattern because there is a wider sampling of descriptors obtained when the user is in different positions, poses, lighting, etc.

In some implementations, descriptors stored in the descriptors data store may decay over a period of time and/or newer descriptors may have a higher weighting to account for changes in the appearance of the user. For example, if a user takes off their jacket or takes off their hat while moving through the materials handling facility, the descriptors may change. To illustrate, if the user is wearing a black jacket and the user pattern representative of the user is segmented to include a torso descriptor region, the descriptor representative of the torso descriptor region may include a color histogram representative of the black jacket. If, while the user is moving through the materials handling facility, the user removes the black jacket and is wearing a yellow shirt, the descriptor for the torso descriptor region will change. Specifically, the color histogram will change to represent the yellow shirt. By decaying or weighting descriptors, the system is more robust to changes.

While the examples discussed above focus on utilizing stored user pattern data and stored descriptors to continually track a movement of a user through a materials handling facility, in some instances tracking of a user may be lost. For example, if a user moves into a non-tracked area where there are no cameras, the current position of the user cannot be maintained (i.e., the stored position of the user is not current) and tracking of the user may be lost. As another example, if the user moves into an area where a camera has become inoperable or moves to a position in which the user cannot be viewed by a camera (e.g., under a table or counter) the position of the user may not be current as tracking of the user may be lost. In still another example, if the user moves into a position in which the systems are unable to confirm that the object is the user, the tracking of the user may be lost. For example, if the user kneels or sits on the floor for an extended period of time such that they are below the user pattern height threshold, the tracking of the user may be lost. In still another example, if the user exits the materials handling facility, the tracking of the user may be lost. Regardless of the reason, a tracking of a user may be determined to be lost if the position of the user is not updated during a defined period of time. For example, as discussed above with respect to FIG. 11, if the position of the user pattern is not updated within a defined period of time, the position of the user is not current and the tracking of the user pattern may be determined to be lost.

Figure 13:
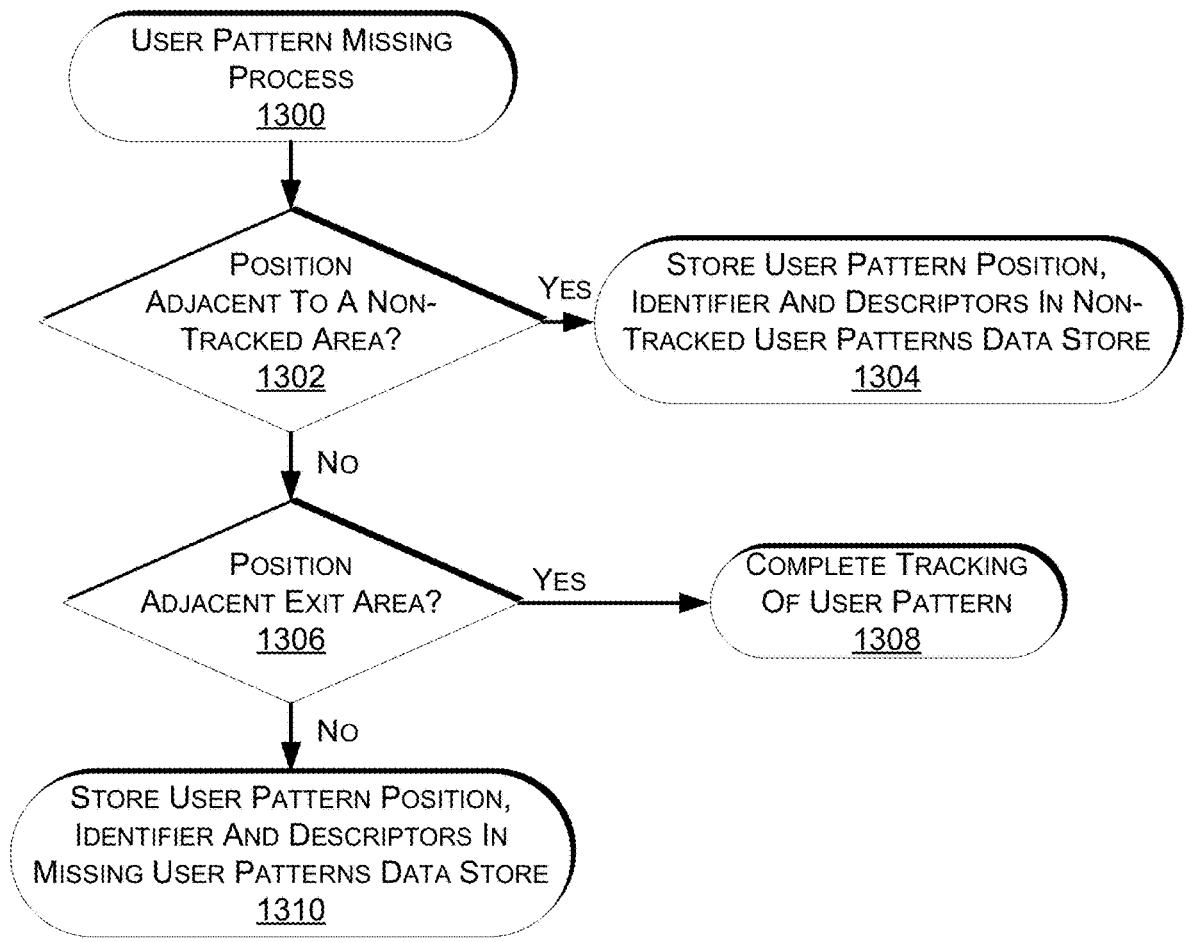
FIG. 13 is a flow diagram of an example user missing process, according to an implementation.

When the position of the user is not current, a user missing process 1300, as discussed with respect to FIG. 13 is performed, according to an implementation. The example process 1300 begins by determining if the stored position or last position of the user pattern is adjacent to an entry or exit of a non-tracked area, as in 1302. A non-tracked area may be any area within the material handling facility where tracking of a user is not available. For example, cameras may not be located in restrooms, changing rooms, break rooms, storage areas, etc. Areas without cameras may be considered non-tracked areas.

If it is determined that the stored position of the user pattern is adjacent a non-tracked area, the user pattern, position of the user pattern, the user identifier (or associated session identifier), the time at which the position of the user became no longer current, and descriptors associated with the user pattern are stored in a non-tracked user pattern data store, as in 1304. In some implementations, it may also be determined based on a series of linked user patterns whether the predicted trajectory of the user pattern is in the direction of the non-tracked area.

While the example process 1300 describes storing each of the user pattern, position, and descriptors in a non-tracked user patterns data store, in some implementations, the user identifier or session identifier of the user may be added to or the non-tracked user pattern data store to identify the user, user pattern, etc., and the user pattern, descriptors, etc., may be maintained in the user pattern data store and descriptors data store, as discussed herein.

If it is determined that the stored position of the user pattern is not adjacent to a non-tracked area, a determination is made as to whether the stored position of the user pattern is adjacent to an exit from the material handling facility, as in 1306. If it is determined that the stored position of the user pattern is adjacent to an exit from the materials handling facility, tracking of the user pattern is completed, as in 1308. If the user returns or re-enters the materials handling facility after exiting, the user will be re-identified and a new session identifier or user identifier generated and used to track the user, as discussed above. In some implementations, before it is determined that the user has exited the materials handling facility, it may also be determined, based on a series of linked user patterns, whether the predicted trajectory of the user pattern is in the direction of the exit from the materials handling facility.

If it is determined that the stored position of the user pattern is not adjacent to an exit from the materials handling facility, the user pattern, position of the user pattern, the user pattern identifier (or associated session identifier), the time at which the position of the user became no longer current, and descriptors associated with the user pattern are stored in a missing user pattern data store, as in 1310. In some implementations, a predicted trajectory of the user associated with the user pattern may also be determined and stored in the missing user patterns data store. The predicted trajectory may be determined based on a series of linked user patterns.

While the example process 1300 describes storing each of the user pattern, position, time, and descriptors in a missing user pattern data store, in some implementations, the user identifier or session identifier of the user may be added to the missing user pattern data store and the user pattern, descriptors, etc., may be maintained in the user pattern data store and descriptors data store as discussed herein.

By storing or identifying user pattern information (e.g., position, user pattern data, and descriptors) in either a missing user patterns data store or a non-tracked area user patterns data store, the information may be used to re-establish tracking of a user when a newly identified user pattern is detected.

FIG. 14 is a flow diagram of a user pattern recovery process 1400, according to an implementation. The example process 1400 begins by detecting a new user pattern at a location within the materials handling facility other than at an entry point into the materials handling facility, as in 1402. As discussed above, an object may be detected from reduced image data as anything that exceeds a difference threshold from baseline image data. Such an object may be determined to be a user and thus represented by a user pattern using the techniques discussed above. If the user pattern cannot be associated with a user or linked to another user pattern, the user pattern is considered a new user pattern.

In addition to detecting a new user pattern, descriptors for the new user pattern may also be determined, as in 1408. Descriptors may be determined as discussed above. For example, the new user pattern may be segmented into one or more descriptor regions and descriptors representative of each descriptor region may be determined.

A determination may be made as to whether a position associated with the new user pattern is adjacent to an entry or exit of a non-tracked area, as in 1410. If the user pattern is adjacent to a non-tracked area, the user represented by the new user pattern may correspond to a user that previously entered the non-tracked area and whose tracking has been lost.

If it is determined that the new user pattern is adjacent to a non-tracked area, the user pattern and the determined descriptors for the new user pattern are compared with user patterns and descriptors identified in the non-tracked user patterns data store, as in 1420. Comparing user patterns and descriptors of a new user pattern with stored user patterns and descriptors included in the non-tracked user patterns data store is discussed further below with respect to FIG. 15. In some implementations, it may be determined whether an identifier, such as an RFID, is detected that can be used to identify the user represented by the new user pattern. If an identifier is detected, the new user pattern may be associated with the corresponding user and the example process 1400 may complete.

If it is determined that the new user pattern is not adjacent to a non-tracked area, the user pattern and the determined descriptors for the new user pattern are compared with user patterns and descriptors identified in the missing user patterns data store that are within a defined distance of the new user pattern, as in 1412. The defined distance may consider both the distance between the last known position of a missing user pattern as well as the time at which the position of the missing user pattern became not current. The longer a user has been missing, the larger the area in which the missing user may be located. As such, the defined distance may be different for different missing user patterns. For example, a user pattern that has been missing five seconds may have a small defined distance and only be considered if it is within that defined distance of the newly identified user pattern. In comparison, a user pattern that has been missing for five minutes will have a larger defined distance (because the user could have moved farther during that amount of time) and will be considered if the position of the newly identified user pattern is within that defined distance. Comparing user patterns and descriptors of a new user pattern with stored user patterns and descriptors included in the missing user patterns data store is discussed further below with respect to FIG. 15.

Based on the comparison of the new user pattern and descriptors with the user pattern and descriptors of the missing user pattern data store that are within a defined distance of the position of the new user pattern, as described below with respect to FIG. 15, a confidence score is returned and a determination is made as to whether the returned confidence score exceeds a threshold, a in 1414. If it is determined that the confidence score does not exceed the threshold, the new user pattern and descriptors may be compared with additional user patterns and descriptors maintained in the missing user patterns data store, as in 1416. Depending on the number of user patterns identified in the missing user patterns data store, the additional missing user patterns may include all the additional missing user patterns or it may include only those that are within a second larger defined distance from the position of the new user pattern. This process of comparing the new user pattern and descriptors with missing user patterns may continue until the confidence score exceeds the threshold or until the new user pattern has been compared to each of the missing user patterns.

Returning to FIG. 14, after the new user pattern and descriptors have been compared with the non-tracked user patterns and descriptors (1420) or after the new user pattern and descriptors have been compared with additional missing user patterns and descriptors (1416), a determination is made as to whether the confidence score returned from the example process 1500 exceeds a threshold, as in 1422. If it is determined that the confidence score does not exceed the threshold, the new user pattern and descriptors are sent for manual review, as in 1418. During manual review, one or more individuals may review images of the new user pattern and compare those images with images of missing user patterns and/or non-tracked user patterns in an effort to reestablish a link between the user represented by the new user pattern and a user represented by one of the missing user patterns or the non-tracked user patterns, so that the current position of the user can be updated and tracking of that user can resume.

If it is determined at decision block 1422 or decision block 1414 that the returned confidence score does exceed the threshold, the missing user pattern or non-tracked user pattern determined to match the new user pattern is removed from the missing pattern data store or the non-tracked user pattern data store, as in 1424. Likewise, the new user pattern is linked to the missing user pattern, or the non-tracked user pattern that is determined to match the missing user pattern, the position associated with the user represented by the matching missing user pattern or the non-tracked user pattern is updated to correspond to the position of the new user pattern, and tracking of the user is resumed, as in 1426.

Figure 15:
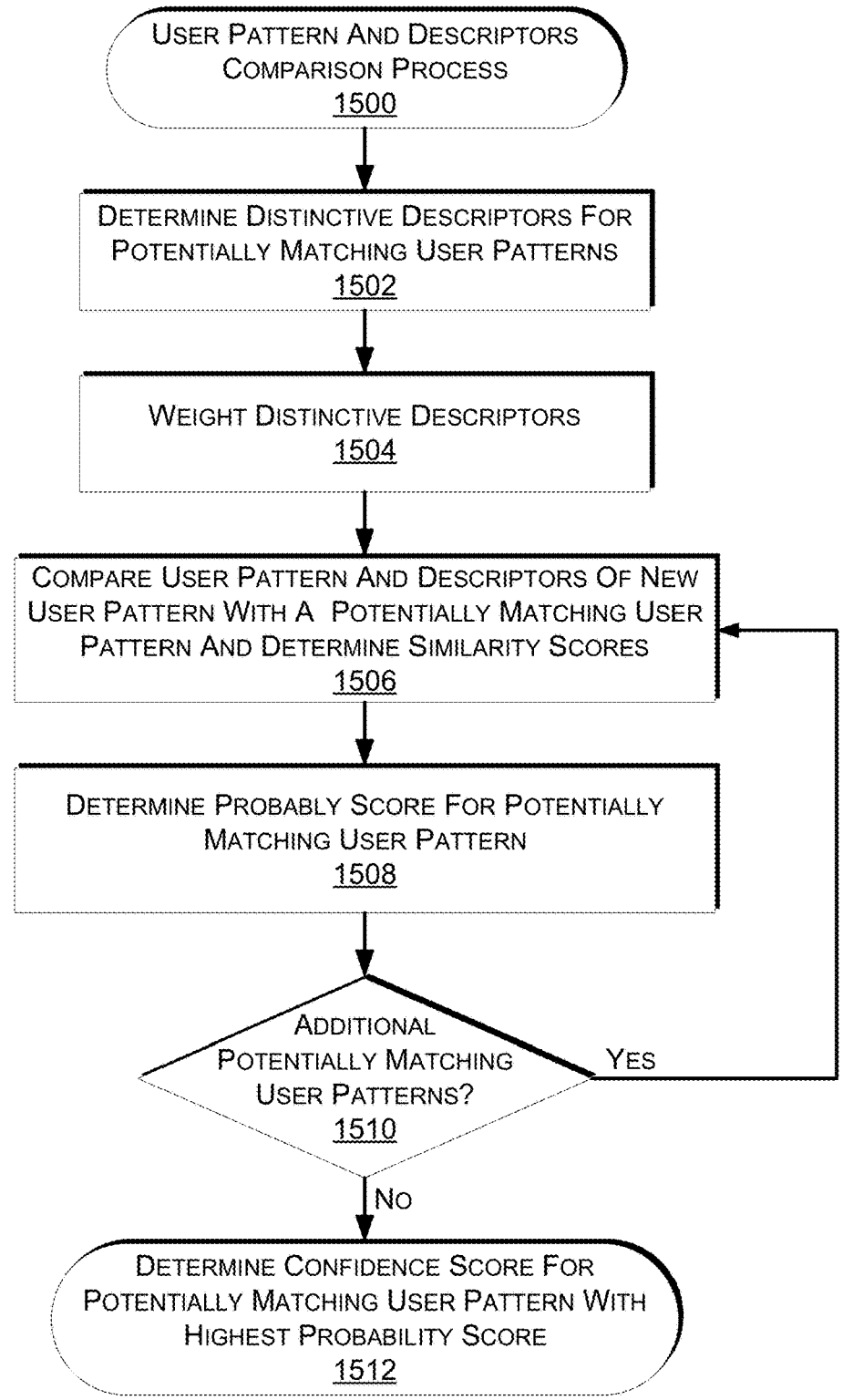
FIG. 15 is a flow diagram of a user pattern and descriptors comparison process, according to an implementation.

FIG. 15 is a flow diagram of an example user pattern and descriptors comparison process 1500, according to an implementation. The user pattern and descriptors comparison process may be utilized to determine distinguishing descriptors associated with potentially matching user patterns (e.g., user patterns identified in the missing user patterns data store or user patterns identified in the non-tracked user patterns data store) and utilize those distinguishing descriptors to determine a confidence score indicating how confident a match has been determined.

The example process 1500 begins by determining distinctive descriptors for potentially matching user patterns, as in 1502. For example, if a new user pattern and corresponding descriptors are compared to user patterns and descriptors stored in the non-tracked user pattern data store, the potentially matching user patterns may include all the user patterns identified in the non-tracked user pattern data store. As another example, if the new user pattern and descriptors are being compared to user patterns identified in the missing user patterns data store, the potentially matching user patterns may be missing user patterns within a defined distance of the position of the new user pattern. Alternatively, the potentially matching user patterns may be all the missing user patterns identified in the missing user patterns data store.

Distinctive descriptors of potentially matching user patterns may be determined by comparing the descriptors of the potentially matching user patterns to identify those that are similar and those that are different. For example, if the potentially matching user patterns are all employees of the materials handling facility and all of the employees are wearing similar uniforms (e.g., blue shirts), the descriptor for the torso descriptor region of those user patterns will not be distinctive as they will all be similar. In comparison, if one of the potentially matching user patterns corresponds to a user wearing a yellow shirt, the torso descriptor for that user pattern may be determined to be distinctive for that user pattern. Comparison of potentially matching user pattern descriptors may be done by processing similar descriptor regions of each potentially matching user pattern to determine a similarity or difference. For example, if each of the descriptors for the torso region of the user patterns include an HSV color histogram, the histograms may be compared to determine a similarity or difference between the color histograms. Descriptors may be compared using any one or more algorithms, such as a Random Forest Classifier and/or based on a Euclidean distance comaprision baesd on height, color, etc. Other techniques for comparison may likewise be utilized.

Each descriptor that is determined to be distinctive for each user pattern may be assigned a higher weight than the non-distinctive descriptors, so that when the descriptors are compared with descriptors of the new user pattern, those that are distinctive will be utilized to determine a similarity between the potentially matching user pattern descriptors and the new user pattern descriptors, as in 1504.

The new user pattern and corresponding descriptors are then compared to the descriptors of a potentially matching user pattern and a similarity score is determined for each compared descriptor, as in 1506. For example, if the potentially matching user pattern has been segmented into three descriptor regions (e.g., head region, torso region, lower body region) and the new user pattern has been segmented into similar descriptor regions, the descriptors of each corresponding region are compared to determine a similarity between the descriptors. For example, the descriptor representative of the head region of the new user pattern may be compared to the descriptor representative of the head region of the potentially matching user pattern and a similarity score determined that indicates a similarity between the two descriptors. Likewise, for those descriptors of the potentially matching user patterns that are determined to be distinctive, the similarity score may be increased by the weighting factor.

Based on a similarity score for each of the potentially matching descriptors between the new user pattern and the potentially matching user pattern, a probability score is determined that is representative of the probability that the potentially matching user pattern corresponds to the new user pattern, as in 1508. The probability score is determined based on the combination of the similarity scores for each of the compared descriptors. For example, if each compared descriptor has a high similarity score, the probability score that the potentially matching user pattern corresponds with the new user pattern will be high. In comparison, if the similarity scores for each descriptor comparison are all low, the resulting probability score will be low. The probability score may be determined based on any combination of the similarity scores. For example, the probability score may be an average of the similarity scores, a sum of the similarity scores, etc.

A determination is also made as to whether there are any additional potentially matching user patterns against which the descriptors of the new user pattern are to be compared with the descriptors of the potentially matching user pattern, as in 1510. If it is determined that there are additional user patterns against which descriptors are to be compared, the example process 1500 returns to block 1506 and continues. However, if it is determined that the descriptors for all the potentially matching user patterns have been compared with the descriptors of the new user pattern, a confidence score is determined for the potentially matching user pattern with a highest probability score, as in 1512.

The confidence score represents a level of confidence that the potentially matching user pattern with a highest probability score corresponds to the new user pattern. In some implementations, the confidence score may be determined based on a ratio of the probability scores, based on a comparison of the highest probability score with other high probability scores, etc. For example, if the highest probability score is 98%, the second highest probability score is 25% and the third highest probability score is 22%, the resulting confidence score may be high because the highest probability score is high and there is a large difference between the highest probability score and the next highest probability score. As another example, if the highest probability score is 98% and the next highest probability score is 97%, the resulting confidence score that the potentially matching user pattern corresponds to the new user pattern may be low because either of the two potentially matching user patterns could be the corresponding user pattern.

While the example illustrated with respect to FIG. 15 describes determining confidence scores and corresponding probability scores based on the ratio of the highest confidence scores, in other implementations, the similarity scores may be determined and if a similarity score exceeds a threshold, it may be determined that the new user pattern corresponds to the missing user pattern which a highest similarity score.

Figure 16:
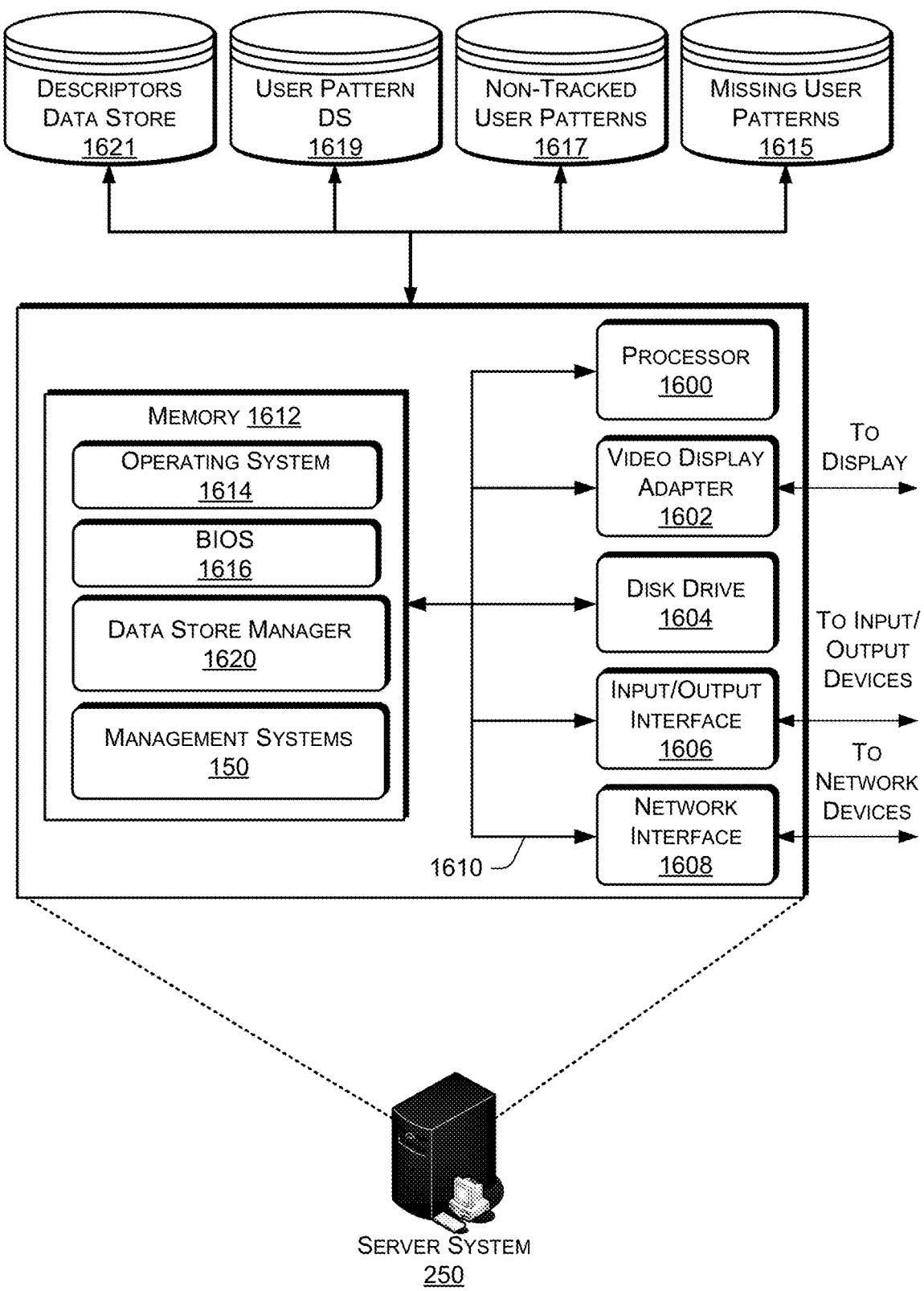
FIG. 16 is a block diagram of an illustrative implementation of a server system that may be used with various implementations.

FIG. 16 is a pictorial diagram of an illustrative implementation of a server system, such as the server system 250 that may be used in the implementations described herein. The server system illustrated in FIG. 16 or another similar server system may be configured to operate as the cluster processing system, the cluster aggregation system and/or for the management systems 150 (inventory management system, user pattern management system).

The server system 250 may include a processor 1600, such as one or more redundant processors, a video display adapter 1602, a disk drive 1604, an input/output interface 1606, a network interface 1608, and a memory 1612. The processor 1600, the video display adapter 1602, the disk drive 1604, the input/output interface 1606, the network interface 1608 and the memory 1612 may be communicatively coupled to each other by a communication bus 1610.

The video display adapter 1602 provides display signals to a local display (not shown in FIG. 16) permitting an operator of the server system 250 to monitor and configure operation of the server system 250. The input/output interface 1606 likewise communicates with external input/output devices not shown in FIG. 16, such as a mouse, keyboard, scanner, or other input and output devices that can be operated by an operator of the server system 250. The network interface 1608 includes hardware, software, or any combination thereof, to communicate with other computing devices. For example, the network interface 1608 may be configured to provide communications between the server system 250 and other computing devices via the network 302, as shown in FIG. 3.

The memory 1612 may be a non-transitory computer readable storage medium configured to store executable instructions accessible by the processor(s) 1600. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1608.

In one implementation, the I/O interface 210 may be configured to coordinate I/O traffic between the processor(s) 202, the non-transitory computer readable storage medium 220, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable storage medium 220) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Additionally, in some implementations, some or all of the functionality of the I/O interface 210, such as an interface to the non-transitory computer readable storage medium 220, may be incorporated directly into the processor(s) 202. The memory 1612 is shown storing an operating system 1614 for controlling the operation of the server system 250. A binary input/output system (BIOS) 1616 for controlling the low-level operation of the server system 250 is also stored in the memory 1612.

The memory 1612 additionally store computer executable instructions, that, when executed by the processor 1600 cause the processor to perform one or more of the processes discussed herein. The memory 1612 additionally stores program code and data for providing network services. The data store manager application 1620 facilitates data exchange between the data stores 1515, 1617, 1619, 1621 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 250 can include any appropriate hardware and software for integrating with the data stores 1615-1621 as needed to execute aspects of the management systems 150.

The data stores 1615-1621 can include several separate data tables, databases or other data storage mechanisms and media for storing data relating to a particular aspect. For example, the data stores 1615-1621 illustrated include mechanisms for maintaining user pattern and/or descriptor information (e.g., positions, user pattern shapes, sizes, colors, depth maps, etc.), mappings between session identifiers and user identifiers, etc. Depending on the configuration and use of the server system 250, one or more of the data stores may not be included or accessible to the server system 250 and/or other data store may be included or accessible. For example, if the server system is supporting the cluster processing system, the server system 250 may not include and/or be able to access a user profile data store (not shown).

It should be understood that there can be many other aspects that may be stored in the data stores 1615-1621. The data stores 1615-1621 are operable, through logic associated therewith, to receive instructions from the server system 250 and obtain, update or otherwise process data in response thereto.

The memory 1612 may also include the inventory management system, user pattern management system, cluster processing system, or the cluster aggregation system, as discussed above. The corresponding server system 250 may be executable by the processor 1600 to implement one or more of the functions of the server system 250. In one implementation, the server system 250 may represent instructions embodied in one or more software programs stored in the memory 1612. In another implementation, the system 250 can represent hardware, software instructions, or a combination thereof.

The server system 250, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 16. Thus, the depiction in FIG. 16 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method, comprising:
under control of one or more computing systems configured with executable instructions,
receiving image data from a plurality of image capture devices located within a materials handling facility, wherein the image data includes an overhead view of at least a portion of a surface within the materials handling facility obtained with an image capture device positioned at a defined distance from the surface;
detecting, based at least in part on depth data included in the image data, an object at a first position within the materials handling facility;
processing the image data to determine a first user pattern representative of the object;
determining, based at least in part on the first position, a plurality of stored user patterns, wherein:
each of the plurality of stored user patterns includes a stored position that is no longer current; and
each of the stored positions are within a defined distance of the first position;
comparing the first user pattern with at least some of the plurality of stored user patterns;
determining a similarity between the first user pattern and a second user pattern of the plurality of stored user patterns;
determining a confidence score that the first user pattern corresponds to the second user pattern based at least in part on the similarity and a distance between the first position and a stored position associated with the second user pattern;
associating the object with a second user represented by the second user pattern based at least in part on the confidence score; and
updating a stored position of the second user to correspond with the first position.

2. The computer implemented method of claim 1, the method further comprising:

determining a first plurality of descriptors representative of the object; and comparing the first plurality of descriptors with a stored second plurality of descriptors representative of the second user; and wherein determining the similarity between the first user pattern and the second user pattern is further based at least in part on a similarity between the first plurality of descriptors and the stored second plurality of descriptors.

3. The computer implemented method of claim 2, wherein the first plurality of descriptors represent at least one of a height of the object, a shape of the object, a size of the object, a width of the object, a facial feature of the object, a pattern of the object, a texture of the object, a clothing pattern of the object, a color histogram of the object, a color histogram of a portion of the object, a color of an item of clothing, a length of a portion of the object, a posture of the object, a pose of the object, a gait of the object, or a speed of movement of the object.

4. The computer implemented method of claim 1, wherein:

processing the image to determine the first user pattern includes using the depth data included in the image data to define a first shape of the first user pattern representative of a shape of the object; and comparing the first user pattern with the plurality of stored user patterns includes comparing the first shape of the first user pattern with stored shapes of each of the plurality of stored user patterns.

5. The computer implemented method of claim 1, further comprising:

selecting the second user pattern based at least in part on:
a first time duration that has elapsed since the stored position associated with the second user pattern became not current; and
the distance between the stored position associated with the second user pattern and the first position.

6. The computer implemented method of claim 1, further comprising:

determining, based at least in part on the first position, the plurality of stored user patterns, wherein:
the first position is adjacent a non-tracked area;
each of the plurality of stored user patterns includes a last known position, wherein the stored position associated with the second user pattern is a last known position; and
each of the last known positions are adjacent the non-tracked area.

7. A system, comprising:
one or more processors; and
a memory storing program instructions that when executed by the one or more processors, cause the one or more processors to at least:
receive image data from an image capture device, wherein the image data includes an overhead view of at least a portion of a surface obtained with the image capture device positioned at a defined distance from the surface;
detect, based at least in part on depth data included in the image data, an object at a first position;
process the image data to determine a first user pattern representative of the object;
determine, based at least in part on the first position, a plurality of stored user patterns, wherein:
each of the plurality of stored user patterns includes a stored position that is no longer current; and
each of the stored positions are within a defined distance of the first position;
compare the first user pattern with at least some of the plurality of stored user patterns;
determine a similarity between the first user pattern and a second user pattern of the plurality of stored user patterns;
determine a confidence score that the first user pattern corresponds to the second user pattern based at least in part on the similarity and a distance between the first position and a stored position associated with the second user pattern;
associate the object with a second user represented by the second user pattern based at least in part on the confidence score; and
update a stored position of the second user to correspond with the first position.

8. The system of claim 7, wherein the program instructions that when executed by the one or more processors, further cause the one or more processors to at least:
determine a descriptor representative of the object; and
compare the descriptor with a stored plurality of descriptors representative of the second user; and
wherein determining the similarity between the first user pattern and the second user pattern is further based at least in part on a similarity between the descriptor and the stored plurality of descriptors.

9. The system of claim 8, wherein:
the descriptor includes a first color histogram representative of at least a first portion the descriptor;
a stored second descriptor corresponding to the second user pattern includes a second color histogram; and
the program instructions that, when executed by the one or more processors to cause the one or more processors to compare the descriptor with the stored plurality of descriptors, further include program instructions that cause the one or more processors to determine a color similarity between the first color histogram and the second color histogram.

10. The system of claim 7, wherein the program instructions that, when executed by the one or more processors to process the image to determine the first user pattern, further include instructions that, when executed by the one or more processors, further cause the one or more processors to at least:
process depth data included in the image data to define a first shape of the first user pattern representative of a shape of the object; and
compare the first shape of the first user pattern with stored shapes of each of the plurality of stored user patterns.

11. The system of claim 7, wherein the program instructions that when executed by the one or more processors, further cause the one or more processors to at least:
select the second user pattern based at least in part on:
a first time duration that has elapsed since the stored position associated with the second user pattern became not current; and
the distance between the stored position associated with the second user pattern and the first position.

12. The system of claim 7, wherein the program instructions that when executed by the one or more processors, further cause the one or more processors to at least:
determine, based at least in part on the first position, the second user pattern, wherein:
the first position is adjacent a non-tracked area; and the stored position associated with the second user pattern is adjacent the non-tracked area.

13. A computer implemented method, comprising:
receiving image data from a plurality of image capture devices;
detecting, based at least in part on depth data included in the image data, an object at a first position;
processing the image data to determine a first user pattern representative of the object;
determining, based at least in part on the first position, a plurality of stored user patterns, wherein:
  each of the plurality of stored user patterns includes a stored position that is no longer current; and
  each of the stored positions are within a defined distance of the first position;
comparing the first user pattern with a second user pattern included in the plurality of stored user patterns;
determining a similarity between the first user pattern and the second user pattern;
determining a confidence score that the first user pattern corresponds to the second user pattern based at least in part on the similarity and a distance between the first user pattern and a stored position associated with the second user pattern;
associating the object with a user represented by the second user pattern based at least in part on the confidence score; and
updating a stored position of the user to correspond with the first position.

14. The computer implemented method of claim 13, the method further comprising:
determining a first plurality of descriptors representative of the object; and
comparing the first plurality of descriptors with a stored second plurality of descriptors representative of the user whose location is not current; and
wherein determining a similarity between the first user pattern and the second user pattern is further based at least in part on a similarity between the first plurality of descriptors and the stored second plurality of descriptors.

15. The computer implemented method of claim 13, wherein:
processing the image to determine a first user pattern includes using the depth data included in the image data to define a first shape of the first user pattern representative of a shape of the object; and
comparing the first user pattern with the second user pattern includes comparing the first shape of the first user pattern with a stored second shape of the second user pattern.

16. The computer implemented method of claim 13, further comprising:
selecting the second user pattern based at least in part on:
  a first time duration that has elapsed since the stored position associated with the second user pattern became not current; and
  the distance between the stored position associated with the second user pattern and the first position.

17. The computer implemented method of claim 13, further comprising:
determining, based at least in part on the first position, the second user pattern, wherein:
  the first position is adjacent a non-tracked area; and
  the stored position associated with the second user pattern is adjacent the non-tracked area.

* * * * *